(12) United States Patent
Ando et al.

(10) Patent No.: US 8,709,539 B2
(45) Date of Patent: Apr. 29, 2014

(54) PROCESS AND APPARATUS FOR PRODUCING COMPOSITE MATERIAL THAT INCLUDES CARBON NANOTUBES

(75) Inventors: Yoshinori Ando, Nagoya (JP); Mukul Kumar, Nagoya (JP); Takeshi Hashimoto, Nagoya (JP); Norio Kurauchi, Nagoya (JP); Hirotaka Masuoka, Seto (JP); Akira Kagohashi, Toki (JP)

(73) Assignees: Meijo University, Nagoya-shi (JP); Meijo Nano Carbon Co., Ltd., Nagoya-shi (JP); Masuoka Ceramic Materials Co., Ltd., Seto-shi (JP)

( * ) Notice: Subject to any disclaimer, the term of this patent is extended or adjusted under 35 U.S.C. 154(b) by 99 days.

(21) Appl. No.: 13/201,747

(22) PCT Filed: Feb. 2, 2010

(86) PCT No.: PCT/JP2010/051427
§ 371 (c)(1),
(2), (4) Date: Sep. 27, 2011

(87) PCT Pub. No.: WO2010/095509
PCT Pub. Date: Aug. 26, 2010

(65) Prior Publication Data
US 2012/0009344 A1    Jan. 12, 2012

(30) Foreign Application Priority Data

Feb. 17, 2009 (JP) .................................. 2009-033921

(51) Int. Cl.
C23C 16/26 (2006.01)
(52) U.S. Cl.
USPC ..................... 427/249.1; 427/255.5; 118/724; 118/729

(58) Field of Classification Search
USPC ...................... 427/249.1, 255.5; 118/724, 729
See application file for complete search history.

(56) References Cited

U.S. PATENT DOCUMENTS 6,346,023 B1    2/2002    Tsuboi et al.
8,207,658 B2 *  6/2012    Talapatra et al. ............. 313/341
(Continued)

FOREIGN PATENT DOCUMENTS

EP    1 878 763 A2    1/2008
JP    2000-86219      3/2000
(Continued)

OTHER PUBLICATIONS

Krishnamurthy, S., et al., "Growth of Carbon Nanotubes on Si Substrate Using Fe Catalyst Produced by Pulsed Laser Deposition". Journal of Nanoscience and Nanotechnology, vol. 8, 5748-5752, 2008.*

(Continued)

*Primary Examiner* — Bret Chen
(74) *Attorney, Agent, or Firm* — J-TEK Law PLLC; Jeffrey D. Tekanic; Scott T. Wakeman

(57) ABSTRACT

A process and an apparatus for producing a composite material utilize a rotatable hollow body that is inclined with an upstream side being higher than a downstream side. A reaction zone is defined within an elongated chamber in the hollow body. Protrusions inwardly extend from an inner peripheral wall of the hollow body adjacent to the reaction zone. Base material is input into the chamber via a base material introduction port and a carbon source vapor is input into the chamber via a carbon source supply port. A heater heats the reaction zone to a temperature at which carbon nanotubes form on the base material from the carbon source vapor. The protrusions catch base material disposed on the inner peripheral wall of the hollow body when the hollow body rotates and then drop the base material through the reaction zone so that the base material contacts the carbon source vapor.

24 Claims, 6 Drawing Sheets

(56) References Cited

U.S. PATENT DOCUMENTS

| | | | |
|---|---|---|---|
| 2003/0044342 A1* | 3/2003 | Alford et al. | 423/445 R |
| 2003/0143151 A1* | 7/2003 | Diener et al. | 423/447.3 |
| 2006/0014275 A1 | 1/2006 | Yanagisawa et al. | |
| 2006/0052509 A1 | 3/2006 | Saitoh | |
| 2006/0067871 A1* | 3/2006 | Hart et al. | 423/447.3 |
| 2006/0104884 A1* | 5/2006 | Shaffer et al. | 423/445 R |
| 2006/0166810 A1* | 7/2006 | Gunderman et al. | 502/64 |
| 2006/0228286 A1 | 10/2006 | Tada et al. | |
| 2007/0025906 A1* | 2/2007 | Pirard et al. | 423/447.3 |
| 2007/0065577 A1* | 3/2007 | Sumakeris et al. | 427/248.1 |
| 2007/0148530 A1* | 6/2007 | Lin et al. | 429/44 |
| 2007/0189953 A1 | 8/2007 | Bai et al. | |
| 2008/0160311 A1 | 7/2008 | Tani et al. | |
| 2008/0187648 A1* | 8/2008 | Hart et al. | 427/8 |
| 2008/0199389 A1* | 8/2008 | Chiu et al. | 423/447.3 |
| 2009/0220767 A1 | 9/2009 | Schloegl et al. | |
| 2009/0321688 A1 | 12/2009 | Saitoh | |
| 2010/0273263 A1 | 10/2010 | Hashimoto et al. | |
| 2010/0330358 A1 | 12/2010 | Hashimoto | |

FOREIGN PATENT DOCUMENTS

| | | |
|---|---|---|
| JP | 2003-252613 | 9/2003 |
| JP | 2003-342840 | 12/2003 |
| JP | 2004-074062 | 3/2004 |
| JP | 2004-75705 | 3/2004 |
| JP | 2005-75661 | 3/2005 |
| JP | 2005-89738 | 4/2005 |
| JP | 2005-130759 | 5/2005 |
| JP | 2005-324999 | 11/2005 |
| JP | 2006 16450 | 1/2006 |
| JP | 2006-223273 | 8/2006 |
| JP | 2006-232643 | 9/2006 |
| JP | 2006-290682 | 10/2006 |
| JP | 2006-342011 | 12/2006 |
| JP | 2007-1808 * | 1/2007 |
| JP | 2007-39623 | 2/2007 |
| JP | 2007-523033 | 8/2007 |
| JP | 2007-280731 | 10/2007 |
| JP | 2007-331989 | 12/2007 |
| JP | 2008-056523 | 3/2008 |
| JP | 2008-535763 | 9/2008 |
| JP | 2010-37113 | 2/2010 |
| WO | 2009/078333 | 6/2009 |

OTHER PUBLICATIONS

Balbuena, Perla B., et al., "Roles of the Catalyst in the Growth of Single-Wall Carbon Nanotubes". Journal of Nanoscience and Nanotechnology, vol. 6, 1-12, 2006.*

Huang, Shaoming, et al., "Metal-Catalyst-Free Growth of Single-Walled Carbon Nanotubes on Substrates". J. Am. Chem. Soc., 2009, vol. 131, No. 6, 2094-2095.*

International Search Report from parent PCT application No. PCT/JP2010/051427.

Bajaj, P. et al., Control of spatial cell attachment on carbon nanofiber patterns on polycarbonate urethane, International Journal of Nanomedicine, 2006, vol. 1, No. 3, p. 361-365.

Aoki, N. et al., Carbon nanotubes as scaffolds for cell culture and effect on cellular functions, Dental Materials Journal, 2007.03, vol. 26, No. 2, p. 178-185.

English translation of Written Opinion from parent PCT application No. PCT/JP2010/051427.

Office Action mailed Mar. 27, 2013 in counterpart Chinese patent application No. 201080002552, including English translation thereof.

Office Action mailed Nov. 19, 2013 in counterpart Chinese patent application No. 2041080008255.2, including English translation thereof.

* cited by examiner

100nm

500nm

500nm

Weight (mg)

10 μm

500nm

PROCESS AND APPARATUS FOR PRODUCING COMPOSITE MATERIAL THAT INCLUDES CARBON NANOTUBES

CROSS-REFERENCE

This application is the U.S. national stage of International Application No. PCT/JP2010/051427 filed on Feb. 2, 2010, which claims priority to Japanese Patent Application No. 2009-033921 filed on Feb. 17, 2009, the entire contents of which are incorporated herein by reference.

TECHNICAL FIELD

The present invention relates to techniques for producing a composite material, in which carbon nanotubes are present on the surface of a base material, and in certain embodiments, relates to techniques for producing a composite material having carbon nanotubes that are formed based on a chemical vapor deposition method (CVD).

BACKGROUND ART

Carbon nanotubes (hereinafter abbreviated as "CNT") are a new material that is attracting attention in numerous fields due to their superior electrical conductivity, thermal conductivity, mechanical strength and other properties. In general, CNT are synthesized by subjecting carbon or a raw material containing carbon to high-temperature conditions in the presence of a catalyst, as necessary. Known examples of commonly used production processes include arc discharge, laser ablation and chemical vapor deposition. Among these, chemical vapor deposition (CVD) synthesizes CNT by thermally decomposing a raw material containing carbon (carbon source). Examples of prior art documents relating to the production of CNT by using CVD include Patent Documents 1 to 3. Patent Document 1 relates to a technique for producing CNT with a fluidized bed that uses a catalyst and a fluidizing agent. In addition, Patent Document 2 relates to a technique for synthesizing CNT by contacting a solid catalyst with a carbon-containing gas in the presence of a fluidizing agent and fluidizing the solid catalyst. Patent Document 3 relates to a technique for producing CNT using camphor as the carbon source.

On the other hand, carbon materials having various diverse forms, including the above-described CNT, are used in various applications. Typical examples include fibrous carbon materials (namely, carbon fibers) and particulate carbon materials having a diameter of 0.1 mm or more or microparticulate carbon materials having an even smaller diameter (such as carbon black). Although carbon materials per se possess characteristics attributable to being composed of carbon, such as superior electrical conductivity, thermal conductivity, acid resistance and mechanical strength, composite materials that further improve upon the various properties of carbonaceous materials are desired for use in various industrial fields (such as the aircraft industry, the battery and other electronic device industries, the health care industry and the architecture and civil engineering industries).

One aspect of these composite materials that is currently attracting attention includes structural composite materials in which carbon nanotubes are caused to be present (and typically, supported) on the surface of a carbonaceous base material or a base material of another organic substance or an inorganic substance. Since carbon nanotubes have high electrical conductivity, low wear and other industrially advantageous properties (for example, absorption of hydrogen and lithium ions) due to their unique microscopic structure, composite materials (such as carbon materials) offering higher levels of performance than in the past are expected to be developed by using these carbon nanotubes. For example, Patent Documents 4 and 5 describe prior art examples of composite materials composed of carbon nanotubes and a carbonaceous base material.

The production of such composite materials is first premised on the need to enable CNT to be present in a suitable state on the surface of a target base material (such as by bonding or adhering). However, since processes that enable CNT to be efficiently formed on a base material (such as a carbonaceous base material) have yet to be developed with any of the above-described processes, composite materials utilizing the above-mentioned properties of CNT are expensive and difficult to provide. For example, the above-mentioned Patent Documents 4 and 5 as well as Patent Document 6 describe examples of the prior art relating to processes for producing CNT.

PRIOR ART DOCUMENTS

Patent Literature

Patent Document 1: Japanese Patent Application Laid-open No. 2003-342840
Patent Document 2: Japanese Patent Application Laid-open No. 2008-056523
Patent Document 3: Japanese Patent Application Laid-open No. 2007-331989
Patent Document 4: Japanese Patent Application Laid-open No. 2007-523033
Patent Document 5: Japanese Patent Application Laid-open No. 2006-342011
Patent Document 6: Japanese Patent Application Laid-open No. 2004-074062

SUMMARY OF THE INVENTION

Therefore, the present invention was conceived for the purpose of solving problems of the prior art relating to the production of composite materials containing carbon nanotubes as was described above, and an object thereof is to provide a production process capable of efficiently producing a composite material (such as a carbonaceous composite material in case a carbonaceous base material is used), in which carbon nanotubes are provided on the surface of a base material (such as a carbonaceous base material). Another object of the present invention is to provide a production apparatus capable of efficiently producing the above-mentioned composite material. In addition, another object of the present invention is to provide a composite material produced according to the production process according to the present invention and a utilized form thereof.

According to the present invention, a process for producing a composite material (such as a carbonaceous composite material) is provided that preferably comprises the formation of carbon nanotubes on the surface of a base material (such as a carbonaceous base material) based on CVD.

That is, the production process disclosed herein is a process for producing a composite material (such as a carbonaceous composite material) having a base material (such as a carbonaceous base material) and carbon nanotubes present (such as by bonding or adhering) on the surface of the base material. This process uses a tubular body having an elongated chamber configured to enable a gas to flow through it, and that is provided so as to be rotatable relative to a major axis and to be heated inside of the chamber. The tubular body is installed in an inclined manner so that the upstream side on one end of the major axis is higher than the downstream side on the other end. In addition, the base material (such as a carbonaceous base material), to which a catalyst (and typically, a microparticulate catalyst) was applied on (e.g., supported on) the surface thereof in advance, is introduced into the chamber of the tubular body, and a vapor comprised of a carbon source for forming the carbon nanotubes on the introduced base material is supplied to form the carbon nanotubes on the surface of the base material. Here, an introduction site for the base material and a supply site for the carbon source vapor are determined so that contact between the base material and the carbon source vapor occurs in a reaction zone disposed in at least one portion of the upstream side of the chamber in the direction of the major axis, and protrusions are provided on an inner peripheral wall of the chamber that faces the reaction zone. The base material is moved from the upstream side to the downstream side as a result of repeatedly lifting up the base material present on the inner peripheral wall by catching the base material on the protrusions by rotating the tubular body about the axis, and then dropping the base material so that the base material and the carbon source vapor make contact in the reaction zone.

Furthermore, "carbon nanotubes (CNT)" described in the present description refer to tubular carbon allotropes (and typically, cylindrical structures having a graphite structure), although there are no special limitations on the form thereof (length or diameter). Typical examples of CNT included in the scope of CNT as referred to herein include so-called single-walled CNT, multi-walled CNT and carbon nanotubes having horn-shaped ends.

According to this process, the base material (such as a carbonaceous base material) is repeatedly lifted up along the inner peripheral wall of the rotating chamber and dropped due to the presence of the protrusions. Consequently, the carbon source vapor can effectively contact the base material (at, for example, a catalyst-supporting site on a carbonaceous base material). Thus, CNT (and typically, mainly multi-walled CNT) can be effectively formed on the surface of the base material. In addition, since the base material moves from upstream to downstream within the cylindrical chamber while being repeatedly lifted up and dropped as described above, opportunities (frequency) for the carbon source vapor to contact the surface of the base material increase as a result thereof, thereby making it possible to increase the amount of CNT formed and adhered (such as by being supported) on the surface of the base material. In addition, the base material supplied from the upstream side can be recovered in the form of a composite material (such as a carbonaceous composite material) on the downstream side together with the CNT formed on the base material. That is, according to the production process of the present configuration, a target composite material can be continuously produced using the above-mentioned tubular body. Thus, according to the production process according to the present invention, a composite material (such as a carbonaceous composite material) can be efficiently produced that has a base material (such as a carbonaceous base material) and CNT present (by, for example, being bonded or adhered) on the surface of the base material.

In a preferable aspect of the production process disclosed herein, the carbon source vapor is supplied directly into the reaction zone. The carbon source vapor is prevented from flowing out (diffusing) to the upstream side or to the downstream side of the reaction zone by supplying a non-oxidizing gas into the chamber at locations upstream and downstream from the reaction zone, and by discharging gas from the reaction zone or from a location in close proximity thereto.

According to this process, since the carbon source vapor and base material (such as a carbonaceous base material) can be caused to contact more effectively in the reaction zone, CNT can be formed more efficiently on the surface of the base material. In addition, according to the above-mentioned process, a phenomenon, in which the carbon source vapor condenses or sublimates outside the reaction zone, can be prevented. This is particularly advantageous in case CNT is produced (formed) on the surface of a base material using a material, which is a liquid or solid at normal temperatures, as the carbon source (and particularly, solid materials at normal temperatures, such as camphor, which will be described below).

In addition, in another preferable aspect of the production process disclosed herein, the base material is an inorganic base material. By forming CNT on the surface of an inorganic base material, it is possible to impart preferable electrical conductivity to the surface of the inorganic base material while also obtaining a desired inorganic composite material having superior mechanical strength.

Alternatively, in another preferable aspect of the production process disclosed herein, the base material is a carbonaceous base material comprised of a carbonaceous material. By forming CNT on the surface of a carbonaceous base material, it is possible to obtain a desired carbonaceous composite material having superior electrical conductivity and mechanical strength.

Alternatively, in another preferable aspect of the production process disclosed herein, a carbonaceous base material is comprised of a carbonaceous material and an inorganic base material, which are simultaneously used as the base material. Since an inorganic base material having CNT is adhered to the surface of a carbonaceous base material, the effects exhibited by the carbonaceous base material as well as the inorganic base material used (such as improved mechanical strength) can be added to a composite material, which is the produced product.

In another preferable aspect of the production process disclosed herein, carbon fibers having a mean diameter of 100 μm or less are used as the carbonaceous base material, and a composite carbonaceous fiber material is produced, in which carbon nanotubes are present (such as by bonding or adhering) on the surface of the carbon fibers.

By forming the CNT on the surface of carbon fibers, it is possible to obtain a desired carbonaceous composite material (namely, a composite carbonaceous fiber material) having superior electrical conductivity and mechanical strength.

Alternatively, in another preferable aspect of the production process disclosed herein, carbon black having a mean particle diameter (and typically, a mean particle diameter derived based on electron microscopy or light scattering) of 1 μm or less is used as the carbonaceous base material, and a composite carbonaceous powder material is produced, in which carbon nanotubes are present (such as by bonding or adhering) on the surface of the carbon black.

By forming the CNT on the surface of a microparticulate carbonaceous material such as carbon black, it is possible to obtain a carbonaceous composite material (namely, a composite carbonaceous powder material) having, in particular, superior mechanical strength.

In addition, in another preferable aspect of the production process disclosed herein, an inorganic porous material is used as the inorganic base material. CNT can be more efficiently produced on the surface of a base material by using an inorganic porous material, such as zeolite, silica gel, etc.

In addition, in another preferable aspect of the production process disclosed herein, the carbon source is comprised of a carbon-containing material that is capable of forming carbon nanotubes by CVD and is a solid at normal temperatures (for example, 25° C.). The present invention can be carried out more easily since solid materials are superior to gaseous raw materials with respect to ease of handling.

In addition, camphor can be preferably used as the carbon source. According to the process disclosed herein, CNT can be efficiently formed on the surface of a base material (such as a carbonaceous base material) by using an inexpensive carbon source as well; as a result, the target composite material (such as a carbonaceous composite material) can be produced at a low cost.

In addition, the camphor is preferably supplied as a liquid material dissolved in an alcohol-based solvent, and camphor vapor formed from the liquid material is preferably supplied to the chamber. A liquid material (liquid-based material) has superior ease of handling similar to that of a solid material. In addition, by supplying a liquid material, in which camphor is dissolved in an alcohol-based solvent, a more stable supply of camphor vapor to the chamber can be realized.

In addition, in another preferable aspect of the production process disclosed herein, the catalyst contains iron (Fe) and cobalt (Co) as catalyst metal atoms, and the content of the catalyst metal component (Fe+Co), based on a value of 100% for the total weight of the carbonaceous base material and the catalyst metal component applied to (for example, supported on) the surface of the base material, is set to 1% by weight to 30% by weight. If the content of the catalyst metal component is set in this manner, the efficiency of forming CNT on the surface of a carbonaceous base material can be improved. Thus, the target carbonaceous composite material can be produced more efficiently.

In addition, according to another aspect of the present invention, an apparatus is provided for producing a composite material (such as a carbonaceous composite material) having carbon nanotubes on a surface of a base material (such as a carbonaceous base material) by contacting a carbon source vapor with a catalyst applied to the surface of the base material, to thereby thermally decompose the carbon source vapor. That is, the apparatus disclosed herein is provided with a tubular body that is disposed with a major axis placed horizontally and is rotatable relative to the major axis. Here, the tubular body is installed in an inclined manner so that an upstream side on one end of the major axis is higher than a downstream side on the other end. In addition, a base material introduction unit is provided that inputs the base material, to which the catalyst has been applied to the surface thereof in advance, into the chamber formed inside the tubular body from a base material introduction port that opens into the chamber. In addition, a carbon source vapor supply unit is provided that supplies to the chamber a vapor comprised of a carbon source from a carbon source supply port that opens into the chamber. In addition, a heater is provided that is capable of heating a reaction zone, which is established over at least a portion of the extent of the chamber in the direction of the major axis, to a temperature at which carbon nanotubes are formed. Protrusions are provided on an inner peripheral wall of the chamber that faces the reaction zone, which protrusions restrict movement of the base material along the inner peripheral wall in a circumferential direction, and the production apparatus is configured to move the base material from the upstream side to the downstream side while repeatedly catching the base material present on the inner peripheral wall on the protrusions and lifting up the base material together with the protrusions by rotating the tubular body about the major axis, and then dropping the base material, which has been lifted up, through an inner space of the chamber as a result of being released from being caught on the protrusions.

According to such an apparatus configuration, by repeating a movement that causes the base material (such as a carbonaceous base material) to be lifted up and dropped using the above-mentioned protrusions, the carbon source vapor can be caused to effectively contact the base material (and typically, a catalyst applied to the surface of the base material). Thus, CNT (and typically, mainly multi-walled CNT) can be efficiently formed from the carbon source vapor. In addition, the base material gradually moves towards the downstream side while being repeatedly lifted up and dropped as described above, and typically as a result thereof, the base material is gradually covered by the product (CNT) in thick layers. Thus, the base material supplied from the upstream side can be recovered as a composite material (such as a carbonaceous composite material) on the downstream side together with the formed CNT. That is, the apparatus of this configuration is suitable for continuous production of a composite material.

In a preferable aspect of the production apparatus disclosed herein, the protrusions are formed in the shape of ribs extending in the direction of the major axis of the tubular body, and are provided in a plurality at intervals (and typically, at roughly equal intervals) in the circumferential direction of the tubular body.

According to such an apparatus configuration, movement of the base material in the circumferential direction of the tubular body is suitably prevented, and lifting and dropping of the base material can be carried out effectively. Thus, contact efficiency (and in turn, production efficiency of CNT, e.g., yield) between the base material (and typically, a catalyst applied to the surface of the base material) and the carbon source vapor can be further enhanced.

In addition, in a preferable aspect of the production apparatus disclosed herein, the carbon source supply port is preferably disposed in the reaction zone (region heated to a temperature at which CNT are formed during production of CNT, or in other words, when the carbon source vapor is supplied from the supply port) or in close proximity thereto, and normally the carbon source supply port is preferably disposed in the reaction zone. By employing a configuration in which the carbon source vapor is supplied directly into a high-temperature region in this manner, a composite material having CNT on the surface of the base material (such as a carbonaceous base material) can be more efficiently formed from the carbon source vapor. In addition, since the occurrence of condensation and sublimation (precipitation of solid material) of the carbon source vapor is less likely even in case a material, which is a liquid or solid at normal temperatures, is used as the carbon source, the apparatus can also be preferably used in the production of a composite material (such as a carbonaceous composite material) that uses this material as the carbon source. In particular, this apparatus is useful as an apparatus for producing a composite material by using a material that is a solid at normal temperatures (such as camphor) as the carbon source.

In addition, in a preferable aspect of the production apparatus disclosed herein, the carbon source vapor supply unit is equipped with a carbon source introduction pipe that extends through the reaction zone and is continuous with the carbon source supply port (and is preferably disposed in the reaction zone or in close proximity thereto). According to such a configuration, heat from the reaction zone is transferred to the carbon source vapor in the carbon source introduction pipe by passing along the wall surface of the introduction pipe from the carbon source supply port, thereby enabling the carbon source vapor to be maintained in a gaseous state (for example, by preventing clogging of the carbon source introduction pipe and by preventing increases in gas flow resistance caused by liquefaction or solidification of the carbon source vapor in the introduction pipe). This is advantageous in terms of continuous operation of the apparatus (namely, continuous production of a composite material having CNT). For example, a composite material (such as a carbonaceous composite material) can be suitably produced over a longer period of time. The effects of employing the above-mentioned configuration can be exhibited, in particular, in case a material, which is a liquid or solid at normal temperatures (and particularly a material that is a solid at normal temperatures, e.g., camphor), is used as the carbon source.

In addition, in a preferable aspect of the production apparatus disclosed herein, a gas supply unit which is configured to supply non-oxidizing gas to the chamber from a first gas supply port disposed upstream of the reaction zone and from a second gas supply port disposed downstream of the reaction zone, and a gas exhaust unit which is configured to discharge gas in the chamber from a gas venting port disposed in the reaction zone or in close proximity thereto, are further provided.

According to such a configuration, by introducing a gas flow into the chamber from the first and second gas supply ports and by discharging excess gas from the gas venting port, spreading (location) of the carbon source vapor introduced from the carbon source supply port can be controlled. For example, by retaining a larger amount of the carbon source vapor in the reaction zone (that is, suppressing diffusion towards the upstream side or downstream side of the reaction zone), CNT from the carbon source vapor can be formed on the surface of the base material (such as a carbonaceous base material) more efficiently. In addition, according to an apparatus employing the configuration described above, a phenomenon, in which the carbon source vapor condenses or sublimates outside of the reaction zone, can be prevented. This is particularly advantageous in case a material, which is a liquid or solid at normal temperatures (and particularly a material that is a solid at normal temperatures such as camphor), is used as the carbon source.

In addition, in a preferable aspect of the production apparatus disclosed herein, the carbon source supply port and the base material introduction port are each disposed in an upstream region of the reaction zone or in proximity to the upstream side thereof, and the gas venting port is disposed in a downstream region of the reaction zone or in proximity to the downstream side thereof. According to such a configuration, during the time that the carbon source vapor supplied from the upstream carbon source supply port moves through the reaction zone to the downstream gas venting port, the base material (such as a carbonaceous base material), which is lifted up along the inner peripheral wall of the chamber and falls through the air while similarly moving from upstream to downstream in the reaction zone, is repeatedly contacted with the carbon source vapor. As a result, CNT from the carbon source vapor can be efficiently (such as at high yield) produced on the surface of the base material.

Furthermore, in another configuration example, the base material introduction port and the gas venting port are respectively disposed in the upstream region of the reaction zone or in proximity to the upstream side thereof, and the carbon source supply port is disposed in the downstream region of the reaction zone or in proximity to the downstream side thereof.

In addition, in a preferable aspect of the production apparatus disclosed herein, the carbon source vapor supply unit is equipped with a storage tank that stores the carbon source for forming the carbon source vapor, and with a vaporization chamber for vaporizing the carbon source supplied from the storage tank. Here, a configuration is employed in which the storage tank stores a liquid material that contains the carbon source, and a portion of the liquid material is conveyed into the vaporization chamber. According to such a configuration, since the carbon source stored in the storage tank is a liquid material, problems are prevented before they happen, such as clogging when the liquid carbon source is conveyed from the storage tank to the vaporization chamber (and typically, conveyed by a pump), thereby achieving a supply of the carbon source while making the supply of the carbon source easier.

In addition, in another preferable aspect of the production apparatus disclosed herein, the carbon source is comprised of a carbon-containing material that is a solid at normal temperatures (for example, 25° C.). Since a solid material is superior to a gaseous raw material with respect to ease of handling, the present invention can be carried out more easily.

In addition, camphor can be particularly preferably used as the carbon source. According to the apparatus disclosed herein, CNT can be efficiently formed on the surface of a base material (such as a carbonaceous base material) by using an inexpensive carbon source as well, and a result, the target composite material (such as a carbonaceous composite material) can be produced at a low cost.

In addition, the camphor is preferably supplied to the carbon source vapor supply unit as a liquid material dissolved in an alcohol-based solvent. A liquid material has superior ease of handling in the same manner as a solid material. In addition, by supplying a liquid material, which is obtained by dissolving the camphor in an alcohol-based solvent, to the carbon source vapor supply unit, a more stable supply of camphor vapor to the chamber can be realized.

In addition, in another preferable aspect of the production apparatus or production process (which can be a production process that uses the above-mentioned apparatus) disclosed herein, it is characterized by the use of a base material (such as a carbonaceous base material), which has been subjected to heat treatment at 150° C. or higher after having a catalyst metal source applied to it, as the base material to which a catalyst has been applied the surface thereof. Such a catalyst-containing base material is preferable as a result of having superior ease of handling (for example, ease of handling when supplying the base material to the chamber). In addition, a material that is a solid at normal temperatures (such as camphor) can be preferably used as the carbon source in any of the production apparatuses or production processes (which can be a production process that uses the above-mentioned production apparatus) disclosed herein.

MODES FOR CARRYING OUT THE INVENTION

Figure 1:
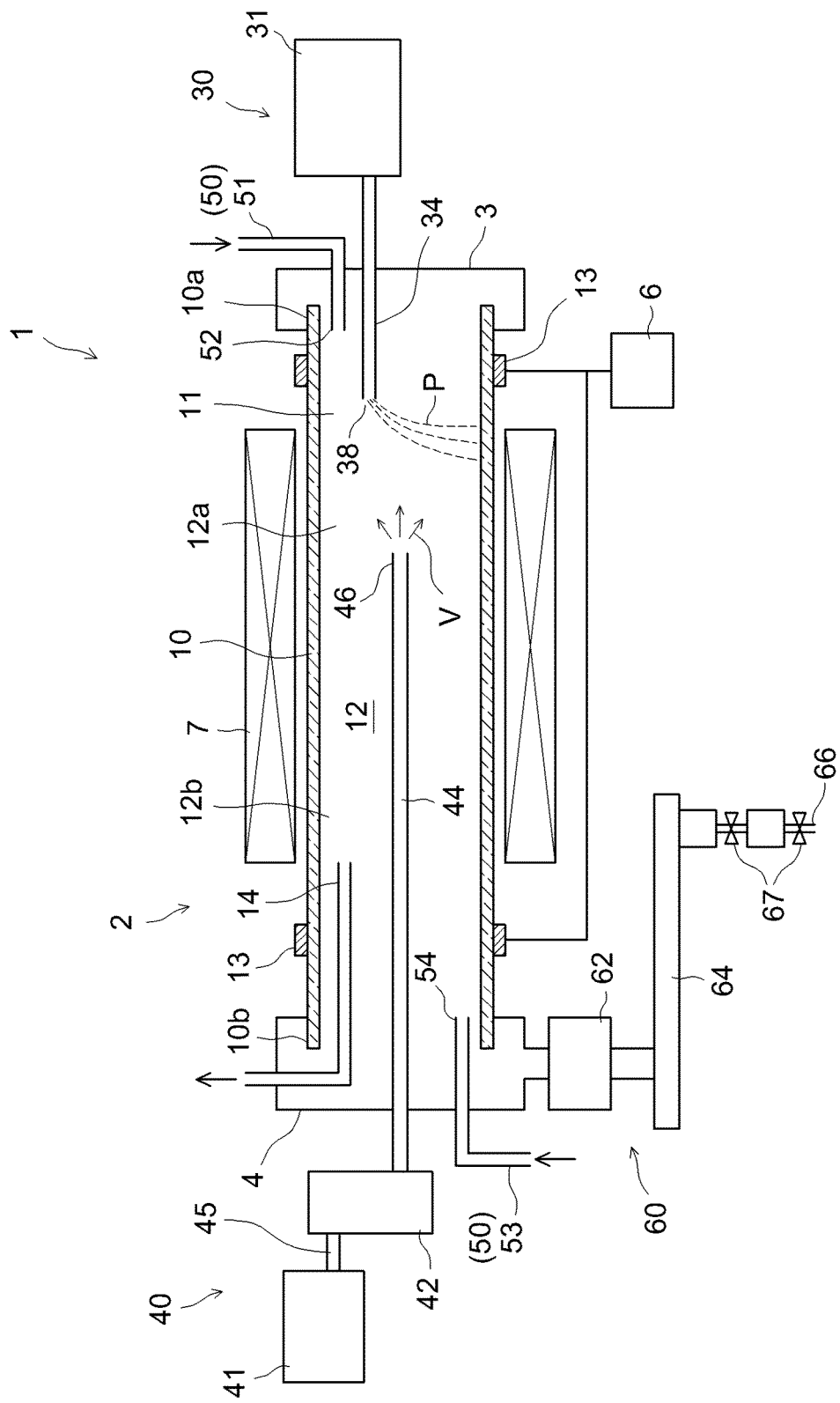
FIG. 1 is a schematic drawing (block diagram) exemplifying the general configuration of a composite material production apparatus according to an embodiment.

The following provides an explanation of preferred embodiments of the present invention. Further, any matters not specifically mentioned in the present description that are required for carrying out the present invention (for example, general matters relating to CVD such as the specific operating procedure for adjusting reaction conditions, such as the reaction zone temperature or pressure, or the process for producing a tubular body per se having a prescribed shape) can be understood to be design matters for a person having ordinary skill in the art based on conventional techniques in the applicable fields. The present invention can be carried out based on the contents disclosed in the present description and common general technical knowledge in the applicable fields.

First, an explanation of materials preferably used in the production process of the present invention will be provided.

1. Base Material

Carbonaceous and other organic or inorganic base materials can be used without any particular limitations as base materials preferably used in production techniques (such as a production process) of the composite material disclosed herein (for example, a carbonaceous composite material or inorganic composite material). The following provides a detailed explanation of carbonaceous base materials and inorganic base materials.

(1) Carbonaceous Base Materials

Any material can be used as the carbonaceous base material used in the production techniques (such as a production process) of a composite material (carbonaceous composite material) without any particular limitations, provided that it is stable in an environment, in which CVD is carried out, and has a shape that enables carbon nanotubes (CNT) to be formed (for example, supported) on the surface thereof. Preferable specific examples include fibrous carbon materials (carbon fibers (CF)), fine particulate carbon materials such as carbon black, and irregularly-shaped activated carbon.

For example, fibrous carbonaceous base materials (namely, carbon fibers) are preferable for use as carbon materials that comprise the wall surfaces of aircraft or automobiles, for example, in industrial fields requiring high mechanical strength, such as high tensile strength or elasticity. In particular, carbon fibers having a mean diameter of 100 μm or less (and for example, 1 μm to 100 μm) and a mean length of 0.01 mm to 100 mm (and for example, a mean length of 0.1 mm to 10 mm) preferably can be used in the production techniques (such as a production process) of the present invention.

In addition, according to the production techniques (such as a production process) disclosed herein, a composite material (carbonaceous composite material) can be produced that has high electrical conductivity, which takes advantage of the electrical properties of CNT. For example, if it is used in a negative electrode constituent material of a lithium ion battery, or in other words, as an electrically conductive material having a large lithium ion absorption capacity per unit weight, a microparticulate (and typically, in which individual particles have a spherical shape) carbonaceous base material having a graphite-type crystal structure preferably can be used. In particular, various types of carbon black, such as acetylene black or Ketjenblack (and typically, carbon black having a mean particle diameter of 1 μm or less, and for example, a mean particle diameter of about 3 nm to 500 nm), preferably can be used.

(2) Inorganic Base Materials

In addition, inorganic base materials that are stable in an environment, in which CVD is carried out, can be used without any particular limitations as an inorganic base material used in the production techniques (such as a production process) of a composite material (inorganic composite material). Alumina, silica, zeolite, magnesia, titania, zirconia, activated carbon, etc. can be given as suitable examples of materials that comprise an inorganic base material (support). The use of an inorganic porous material, such as zeolite or silica gel, is particularly preferable since these materials are suitable for supporting catalyst metals and enable CNT to grow very efficiently. For example, zeolite having a specific surface area of about 400 m$^2$/g to 800 m$^2$/g, as determined by BET, preferably can be used. High-silica zeolite is particularly preferable. For example, zeolite having a $SiO_2/Al_2O_3$ ratio of 10 or more (Si/Al ratio of 5 or more) is preferable, while zeolite having a $SiO_2/Al_2O_3$ ratio of 100 or more (Si/Al ratio of 50 or more) is more preferable. Silica having a $SiO_2/Al_2O_3$ ratio of 200 or more (Si/Al ratio of 100 or more, and for example, about 200) is even more preferable. For example, a powdered inorganic base material (support) having a mean particle diameter of about 0.1 μm to 100 μm (more preferably about 0.5 μm to 10 μm, and, for example, about 1 μm to 2 μm) preferably can be used.

2. Carbon Source

Next, an explanation of a material (namely, a carbon source), which is used to supply a vapor for forming the carbon nanotubes on the base material (such as a carbonaceous base material or inorganic base material) that has been introduced (for example, disposed) inside a chamber of a tubular body in the production technique (such as a production process) disclosed herein, is provided.

Various carbon (C)-containing materials capable of forming CNT by CVD can be used as the above-mentioned carbon source. A carbon source that is a gas, liquid or solid at normal temperatures (for example, 25° C.) can also be used. For example, a carbon-containing gas, such as carbon monoxide, a saturated hydrocarbon such as methane, ethane, propane or butane, an unsaturated hydrocarbon containing one or more double bonds in the molecule, such as ethylene, propylene, butene or isobutene, an unsaturated hydrocarbon containing one or more triple bonds in the molecule, such as acetylene, an aromatic hydrocarbon such as benzene, toluene, xylene or naphthalene, an alcohol such as methanol or ethanol, camphor, or a mixture thereof, can be used as the carbon source. The use of a carbon source having a high carbon content is preferable.

In the production techniques (such as a production process) disclosed herein, a carbon source that is a liquid or solid at normal temperatures is preferable from the viewpoint of ease of handling and costs, and particularly preferably a liquid material (liquid-based material) can be used. If a carbon source is used that is a solid at normal temperatures (such as a subliming solid), a carbon source, such as camphor or naphthalene, preferably can be used.

In addition, if a carbon source is used that is a solid at normal temperatures, a liquid material obtained by dissolving the carbon source, such as camphor or naphthalene, in an alcohol-based solvent (such as ethanol or a denatured alcohol obtained by mixing a substance such as methanol or isopropanol (IPA) with ethanol) preferably can be used, and the effectiveness of applying the present invention can be exhibited particularly well. For example, if a liquid material is used that is obtained by dissolving camphor, used as the carbon source, in ethanol, the ethanol is preferably used at about 10 parts by weight to 1000 parts by weight based on 100 parts by weight of the camphor. The ethanol is more preferably used at about 10 parts by weight to 100 parts by weight. The ethanol is even more preferably used at about 20 parts by weight to 60 parts by weight.

A particularly preferable example of a carbon source in the present invention is camphor ($C_{10}H_{16}O$). Camphor can be easily obtained from vegetation (that is, it can be obtained without reliance on fossil fuels). Thus, by using camphor as the carbon source, the environmental burden is expected to be reduced as compared to the use of a petroleum product (such as acetylene or benzene) as the carbon source. The camphor, which is used to produce CNT by application of the production techniques (such as a production process) disclosed herein, may be one that occurs naturally (naturally-occurring camphor) or a synthetic product (synthetic camphor), and these may also be used in combination. Any of the d-form (d-camphor), dl-form or l-form of camphor can be used. Only one type of these isomers may be used or a mixture of two or more types of these isomers may be used. From the viewpoint of ease of acquisition and the like, it is preferable to normally use mainly dl-camphor. At least those carbon sources composed mainly of camphor preferably can be used, and the carbon source may contain components other than camphor. Camphor having a purity of 90% by weight or more is preferably used as the carbon source (that is, a carbon source is preferably used in which the camphor content is 90% by weight or more). The use of camphor having a purity of 95% by weight or more is more preferable.

3. Catalyst

One type or two or more types of metals capable of catalyzing the thermal decomposition of the carbon source (such as camphor) during CVD can be used as the catalyst(s) (catalyst metal) used in the production techniques (such as a production process) of a composite material (such as a carbonaceous composite material) disclosed herein. For example, one type or two or more types of metals selected from the group consisting of iron (Fe), cobalt (Co), nickel (Ni), molybdenum (Mo), ruthenium (Ru) and copper (Cu) can be used as the metal catalyst(s). At least one of Fe and Co preferably can be used, and the combined use of Fe and Co is particularly preferable. By using these, higher quality carbon nanotubes (e.g., which satisfy one or two or more conditions from among: having a more uniform tubular shape, having higher crystallinity and having a lower quantity of sedimented carbon not joined in the CNT composition) can be formed (supported) on the base material as compared to using Fe or another metal species alone as the catalyst metal. In addition, the formation rate of CNT can be further enhanced as compared to using only Co as the catalyst metal. In a preferable aspect, the catalyst metal is substantially comprised of Fe and Co.

In addition, the shape of the catalyst is preferably a shape that is suitable for application to (for example, supporting on) the surface (namely, a surface of a base material capable of being contacted by a carbon source gas) of a base material (such as a carbonaceous base material or inorganic base material), preferably in advance. For example, a microparticulate catalyst having a mean particle diameter of 1 μm or less (and preferably 100 nm or less), as determined based on light scattering or observing with an electron microscope (SEM or TEM), is preferable.

In the production techniques (such as a production process) of a composite material (such as a carbonaceous composite material or inorganic composite material) disclosed herein, a base material as described above (such as a carbonaceous base material or inorganic base material) is used, on which the catalyst has been supported in advance (will be referred to as a "CNT-supporting base material"). Such a CNT-supporting base material is easily obtained, e.g., by applying a material capable of yielding an elementary metal (such as a salt of the metal, will also be referred to as a "catalyst metal source") to the base material and by heating the mixture that contains the catalyst metal used as a constituent thereof. If a CNT-supporting base material is produced that has two or more types of catalyst metals, a catalyst metal source corresponding to each catalyst metal may be used, or a catalyst metal source containing two or more types of catalyst metals may be used. After having applied such a catalyst metal source to the base material, a desired CNT-supporting base material, in which catalyst metal(s) is (are) supported in the form of an elementary metal or an alloy, can be obtained by heating the base material as necessary (and preferably, by heating in a non-oxidizing atmosphere). The heating temperature at this time can be, for example, about 150° C. or higher (and typically, about 150° C. to 300° C.), and normally is preferably about 200° C. or higher (for example, about 200° C. to 250° C.). By doing this, the ease of handling of the base material (in case the CNT-supporting base material is produced using a fibrous or particulate base material, or in case the CNT-supporting base material is produced using a powdered inorganic base material (such as zeolite)) can be improved. For example, by reducing the hygroscopicity of a fibrous or particulate CNT-supporting base material, problems such as clogging of a CNT-supporting base material introduction path, such as a screw feeder (refer to the embodiment that will be subsequently described), when conveying the CNT-supporting base material into a below-described chamber through the introduction path can be more effectively prevented. In addition, cohesion of the CNT-supporting base material can be prevented to a greater degree, and the CNT-supporting base material can be more effectively contacted with the carbon source vapor (and in turn, CNT are formed more efficiently on the surface of the CNT-supporting base material).

Examples of preferably used catalyst metal sources include corresponding catalytic metal acetates, nitrates, chlorides, sulfates, acetylacetonates, metallocenes (ferrocene, cobaltocene, nickelocene, etc.) such as ferrocene ($Fe(C_5H_5)_2$), metal phthalocyanines (Fe-phthalocyanine, Co-phthalocyanine, Ni-phthalocyanine, etc.), and iron pentacarbonyl ($Fe(CO)_5$).

The following provides an explanation of preferable specific examples. First, a catalyst metal source solution is prepared by dissolving one type or two or more types of metal catalyst sources in a suitable solvent. The type and amount of catalyst metal source used to prepare this solution can be determined so as to correspond to the composite ratio of catalyst metal to be contained in the target CNT-supporting base material. For example, if a metal catalyst is produced with Fe and Co as the catalyst metals by using iron (II) acetate (($CH_3COO)_2Fe$, will also be referred to as "IA") as the Fe source and by using cobalt acetate tetrahydrate ($(CH_3COO)_2Co.4H_2O$), will also be referred to as "CA") as the Co source, a catalyst source solution having a molar ratio of Fe to Co of about 1:0.7 can be prepared by dissolving these catalyst metal sources in a suitable solvent (such as water) at a weight ratio of IA:CA of 1:1.

Next, the catalyst metal source solution prepared in this manner is impregnated into a base material (such as a carbonaceous base material or inorganic base material). For example, a fibrous (or particulate) carbonaceous base material or a particulate inorganic base material (for example, a ceramic material such as zeolite, a naturally-occurring mineral material or various metal materials) is added to the solution and dispersed therein. Ultrasonic vibrations may be applied to suitably carry out this dispersion. The amount of base material added at this time is determined so as to correspond to the catalyst metal content (namely, the weight ratio of catalyst metal to the total weight of the base material and catalyst metal) in the target CNT-supporting base material. Subsequently, the CNT-supporting base material, in which the catalyst metal source is supported on the base material, can be obtained by removing the solvent. Methods, such as drying at normal pressure under heating conditions as necessary or vaporizing the solvent (such as water) under reduced pressure while in a frozen state (freeze-drying), preferably can be used to remove the solvent.

Further, the catalyst-containing inorganic base material (CNT-supporting base material) having the catalyst supported on the surface of the inorganic base material is added to a suitable solvent (for example, an alcohol (such as ethanol or denatured alcohol obtained by mixing a substance such as IPA, n-propyl alcohol (NPA) or methanol with ethanol) or water), and a carbonaceous base material (such as CF) is added to the solution and dispersed therein. Subsequently, a CNT-supporting base material, in which the catalyst-containing inorganic base material is adhered (for example, supported) on the surface of the carbonaceous base material, can be obtained by removing the solvent. At this time, the catalyst-containing inorganic base material is preferably used at about 0.01 parts by weight to 1000 parts by weight based on 100 parts by weight of the carbonaceous base material. More preferably, the catalyst-containing inorganic base material is used at about 0.1 parts by weight to 100 parts by weight. Even more preferably, the catalyst-containing inorganic base material is used at about 0.1 parts by weight to 30 parts by weight. Furthermore, the catalyst-containing inorganic base material may also be supported on the surface of a catalyst-containing carbonaceous base material in the same manner as was described above.

The method used to apply the catalyst metal source solution to the base material (such as a carbonaceous base material or inorganic base material) is not limited to the previously described method. For example, a conventionally known method, such as spraying the solution onto the base material, can be employed without any particular limitations. In addition, the solvent used to prepare the catalyst metal source solution is only required to be one that fully dissolves the catalyst metal source used, and there are no particular limitations thereon. From the viewpoint of ease in removing the solvent, a solvent capable of easily vaporizing in a temperature range of about 40° C. to 100° C. at normal pressure is preferable. For example, one type of solvent selected from the group consisting of water, lower alcohol (such as methanol, ethanol or propanol), acetone and tetrahydrofuran, or a mixed solvent of two or more types thereof, preferably can be used.

There are no particular limitations on the content of the catalyst metal component (metal atoms) in the CNT-supporting base material obtained in this manner based on a value of 100% by weight for the total weight of the weight of the catalyst metal atoms (namely, the weight of catalyst metal components such as Fe or Co in a compound added as the catalyst) and the weight of the base material (such as a carbonaceous base material or inorganic base material).

For example, in case the base material is a carbonaceous base material, a CNT-supporting base material preferably can be used, in which the catalyst metal content is within the range of about 0.1% by weight to 40% by weight. The use of a CNT-supporting base material is preferable, in which the catalyst content is within the range of about 1% by weight to 30% by weight (and more preferably within the range of about 2% by weight to 20% by weight).

In addition, in case the base material is an inorganic base material (such as zeolite) (and including the case in which a catalyst-containing inorganic base material is adhered to the surface of a carbonaceous base material), a CNT-supporting base material can be used, in which the catalyst metal content is within the range of about 1% by weight to 70% by weight. The use of a CNT-supporting base material is preferable, in which the catalyst content is within the range of about 20% by weight to 60% by weight (preferably within the range of about 25% by weight to 55% by weight, more preferably about 30% by weight to 50% by weight, and particularly preferably about 35% by weight to 45% by weight).

If the catalyst metal content is below the above-mentioned range, the CNT production efficiency (for example, yield per unit time, yield per unit weight of metal catalyst, or yield with respect to weight of the carbon source (camphor) used) tends to decrease. On the other hand, if the catalyst metal content is higher than the above-mentioned range, the utilization efficiency of the catalyst metal tends to decrease, and as a result, the CNT yield per unit weight of catalyst metal can exhibit a decreasing tendency. In addition, depending on the application, the amount of catalyst in the composite material produced (such as a carbonaceous composite material or inorganic composite material) becomes excessive, thereby making it undesirable.

In case Fe and Co are used as the metal catalysts, the ratio of Fe and Co contained in the CNT-supporting base material can be a ratio such that, for example, the weight ratio of iron (II) acetate (IA) to cobalt acetate tetrahydrate (CA) is within the range of about 75:25 to 20:80. The weight ratio is preferably within the range of about 60:40 to 40:60, and more preferably within the range of about 55:45 to 45:55 (such as about 50:50). In case a compound other than iron (II) acetate (such as iron nitrate) is used as the Fe source, the weight ratio of IA:CA, if the amount of Fe contained in the iron source is converted into IA, is preferably within the above-mentioned range(s).

Next, an explanation of a production apparatus preferably used in the production process of the present invention will be provided with reference to the drawings.

As shown in FIG. 1, a composite material production apparatus 1 according to the present embodiment is equipped with a cylindrical-shaped tubular body 10, in which a plurality of protrusions 20 (see FIGS. 2 and 3) are provided on the inner peripheral wall thereof, a CNT-supporting base material introduction unit (CNT-supporting base material supply unit) 30 configured to input a CNT-supporting base material P into a chamber 11 formed inside the tubular body 10, a carbon source vapor supply unit 40 configured to supply a carbon source vapor V into the chamber 11, and a heater 7 capable of heating a reaction zone 12, which exists approximately in the center of the chamber 11, to a temperature at which CNT will form on the surface of the base material (such as a carbonaceous base material or an inorganic base material). Openings in the upstream side 10a and downstream side 10b of the tubular body 10 are respectively covered by an upstream cover 3 and a downstream cover 4. The chamber 11 is formed into a compartment by a reactor 2 configured to include the tubular body 10, the upstream cover 3 and the downstream cover 4.

The tubular body 10 is ideally formed into the shape of a straight tube (that is, so that the axis (major axis) thereof extends in a straight line), and the cross-sectional shape thereof preferably has rounded corners like a circular shape, oval shape, egg shape or elliptical shape. Alternatively, the cross-sectional shape may be that of a polygon (and preferably having six or more sides, such as 6 to 20 sides). A tubular body 10 having a circular or a regular polygonal cross-sectional shape is preferable since it will facilitate rotation at a constant speed about the axis (about the major axis), while a tubular body 10 having a circular horizontal cross-section (namely, a cylinder) is particularly preferable. The wall thickness of the tubular body 10 can be about 2 mm to 10 mm, although there are no particular limitations thereon. The thickness of the tubular body 10 of the present embodiment is 4 mm.

The tubular body 10 is disposed with its axis (major axis) lying horizontal and inclined at a prescribed angle from the horizontal such that the other end 10b thereof in the axial direction (direction of the major axis) is lower than the first end 10a (namely, so that the one end 10a is higher than the other end 10b). The size of the inclination angle (the angle formed between the axis (major axis) of the tubular body 10 and the horizontal) can be suitably set based on consideration of the configuration of the apparatus 1 (such as the inner diameter of the tubular body 10 or the length of the reaction zone 12), the operating conditions, the CNT formation efficiency, etc., and there are no particular limitations thereon. Normally, the tubular body 10 is suitably arranged (installed) so that the inclination angle is greater than 0° and is about 30° or less, and the inclination angle is preferably about 1° to 15° (for example, about 3° to 7°). In a preferable example of the configuration of the apparatus 1, the above-mentioned pedestal has the function of adjusting the inclination angle of the tubular body 10 (namely, varying the inclination angle). Furthermore, the one end 10a of the tubular body 10 corresponds to the upstream side and the other end 10b corresponds to the downstream side based on the direction in which the CNT-supporting base material P moves while it is being repeatedly lifted up and dropped. In the following explanation, the one end 10a of the tubular body 10 may be referred to as the upstream side while the other end 10b may be referred to as the downstream side. Furthermore, the tubular body 10 in FIG. 1 is shown as having an inclination angle of 0° so as to facilitate an understanding of each component of the apparatus and to facilitate the legibility of the reference symbols.

The composite material production apparatus 1 of the present embodiment has a pedestal (not shown) that supports the tubular body 10, which is disposed (installed) in the prescribed inclined orientation, so that it is rotatable about the axis (rotatable relative to the major axis), and is configured such that the tubular body 10 is capable of rotating at a prescribed speed (number of revolutions) by transmitting driving power from a rotary driving mechanism 6 through a transmission member 13 (for example, by meshing of gears) affixed to the outer periphery (at the two locations on the upstream side 10a and the downstream side 10b of the tubular body 10 in the example shown in FIG. 1) of the tubular body 10. The speed at which the tubular body 10 is rotated can be suitably set based on consideration of the configuration of the apparatus 1 (such as the inner diameter of the tubular body 10 or the length of the reaction zone 12), the operating conditions, the CNT formation efficiency, etc., and there are no particular limitations thereon. Normally, the rotating speed of the tubular body 10 is suitably greater than 0 rpm and is about 10 rpm or less, and is preferably about 0.1 rpm to 5 rpm (for example, about 0.2 rpm to 2 rpm).

Figure 2:
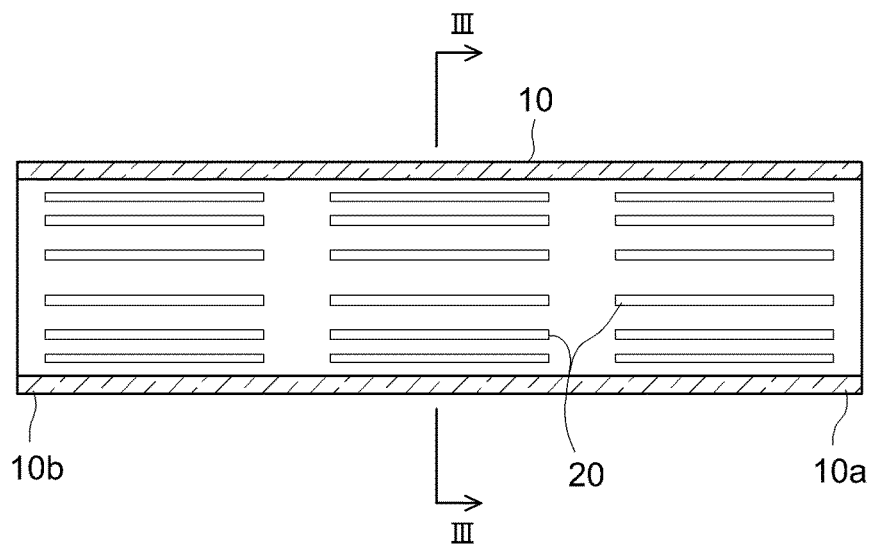
FIG. 2 is a schematic cross-sectional view exemplifying the structure of a tubular body according to an embodiment.
Figure 3:
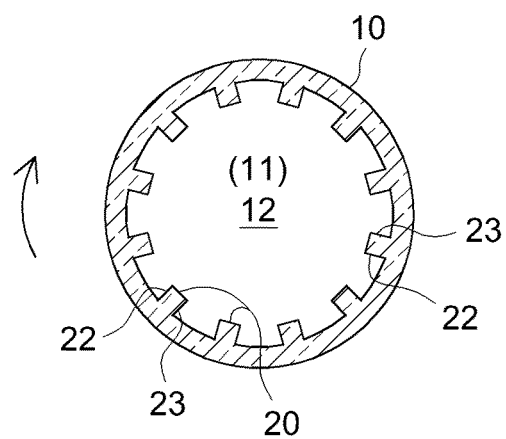
FIG. 3 is a cross-sectional view taken along line III-III in FIG. 2.

A plurality of protrusions 20 extending in the shape of ribs are provided in the axial direction (direction of the major axis) of the tubular body 10 (and parallel to the axis (major axis) in the example shown in FIG. 2) on the inner peripheral wall of the tubular body 10 (chamber 11) as shown in FIGS. 2 and 3. These protrusions 20 are divided into three groups consisting of groups at the one end 10a, at the other end 10b and in the central portion of the tubular body 10 therebetween, and the protrusions 20 that compose each group are disposed at prescribed intervals (and typically at equal intervals) in the circumferential direction of the tubular body 10. From the viewpoint of CNT production efficiency, etc., normally the number of protrusions 20 in the circumferential direction is suitably two or more (and typically about 2 to 36), and is preferably four or more (and typically about 4 to 24). In the example (present embodiment) shown in FIGS. 2 and 3, twelve protrusions 20 are provided at equal intervals (namely, at 30° intervals) in the circumferential direction.

Furthermore, in the example shown in FIG. 2, although the protrusions 20 are also provided outside (upstream side and downstream side) of the reaction zone 12 (the portion surrounded by the heater 7) in the axial direction (the direction of the major axis), the range over which the protrusions 20 are provided may be only the reaction zone 12, or the range may project slightly (for example, by about 5 cm to 10 cm) beyond the reaction zone 12 in the axial direction (the direction of the major axis). In addition, although the protrusions 20 are divided (here, into three groups) in the axial direction (the direction of the major axis) in the example shown in FIG. 2, the protrusions 20 may also be provided in a connected form in the axial direction (the direction of the major axis). Thermal strain on the tubular body 10 can be reduced by providing the protrusions 20 while dividing into groups in the axial direction (the direction of the major axis). This is advantageous from the viewpoint of improving the durability of the tubular body 10, etc. There are no particular limitations on the length of each of the protrusions 20 in the axial direction (direction of the major axis), and the length can be suitably set based on consideration of the length of the reaction zone 12, the effects of thermal strain as described above, etc. Normally, the length of the protrusions 20 in the axial direction (the direction of the major axis) is suitably about 10 cm or more (for example, suitably about 10 cm to 100 cm), and preferably is about 20 cm or more (for example, 20 cm to 80 cm). In the present embodiment, protrusions 20 having a length of about 60 cm are disposed in the axial direction (the direction of the major axis) at intervals of about 10 cm between each group (namely, in the axial direction (the direction of the major axis)).

The cross-sectional shape of the protrusions 20 is such that they are able to restrict movement (skidding) of the CNT-supporting base material along the inner peripheral wall of the tubular body 10 (chamber 11) in the circumferential direction, and the CNT-supporting base material P is lifted up and dropped in the internal space of the chamber 11 following the rotation of the tubular body 10 (see FIG. 5) by catching the CNT-supporting base material P on the protrusions 20. For example, in addition to the rectangular shape shown in FIGS. 2 and 5, the cross-sectional shape of the protrusions 20 can be trapezoidal, triangular, etc. Normally, the angle formed between a front surface 22 of the protrusions 20 (the surface facing the direction of rotation) and the inner peripheral surface of the tubular body 10 is suitably, for example, about 60° to 120°, and preferably is about 75° to 95° (for example, about 90°). In this case, lifting up and dropping of the CNT-supporting base material P can be effectively carried out. On the other hand, the angle formed between a rear surface 23 of the protrusions 20 and the inner peripheral surface of the tubular body 10 can be, for example, about 45° to 150°, and normally is preferably about 60° to 120° (for example, about 90° to 120°).

Although there are no particular limitations thereon, the height of the protrusions 20 can be, for example, about 1 mm to 100 mm, and normally is suitably about 2 mm to 30 mm (for example, about 2 mm to 10 mm). If the height of the protrusions 20 is too low, the efficiency of the function of lifting up and dropping the CNT-supporting base material P tends to decrease. If the height of the protrusions 20 is too high, the durability of the tubular body 10 may readily decrease due to thermal strain, etc. In addition, the width of the protrusions 20 can be, for example, about 1 mm to 20 mm, and normally is suitably about 2 mm to 10 mm. If the width of the protrusions 20 is too small, the protrusions 20 may be easily damaged, while if the width of the protrusions 20 is too large, the durability of the tubular body 10 may readily decrease due to thermal strain, etc. In the present embodiment, the cross-sectional shape of the protrusions 20 is that of a rectangle having a width of 4 mm and a height of 4 mm, and the angles formed between the front surface 22 and rear surface 23 and the inner peripheral surface of the tubular body 10 are both about 90°.

A material having a heat resistance that corresponds to the above-described CNT formation temperature (typically, about 500° C. to 1000° C.) as well as a high chemical stability can be suitably employed as the constituent material of the tubular body 10. A particularly preferable example of a constituent material is quartz glass (present embodiment). The use of a tubular body 10 made of quartz glass (quartz tube) is also preferable from the viewpoint of being easy to confirm the state of the interior by seeing through the wall of the tubular body. Examples of other materials that can be preferably used in the composition of the tubular body 10 include heat-resistant ceramic materials, such as alumina, zirconia, silicon carbide or silicon nitride. The walls of the tubular body 10 and the protrusions 20 are preferably composed (and typically, integrally composed) of the same material.

The inner diameter (referring to the inner diameter where the protrusions 20 are not formed) and the length of the tubular body 10 can be suitably set based on consideration of the desired CNT production capacity, equipment costs, etc. From the viewpoint of being suitable for efficiently contacting the CNT-supporting base material P with the carbon source vapor by utilizing the lifting and dropping of the CNT-supporting base material P, the composite material production apparatus 1 disclosed herein preferably can be implemented in one aspect that uses a tubular body 10 having an inner diameter of, for example, about 5 cm or more. If the inner diameter of the tubular body 10 is too small, it becomes difficult to ensure an adequate distance over which the CNT-supporting base material P falls, and it tends to be difficult to adequately exhibit the effectiveness of contacting the CNT-supporting base material P with the carbon source vapor by utilizing the above-described dropping. Normally, the inner diameter of the tubular body 10 is preferably about 10 cm or more, more preferably is about 15 cm or more, and for example, is about 20 cm or more. In addition, from the viewpoint of equipment costs, strength, etc., normally the inner diameter of the tubular body 10 is preferably about 150 cm or less, and more preferably about 100 cm or less (for example, 50 cm or less). The inner diameter of the tubular body 10 in the apparatus 1 of the present embodiment is 25 cm and the outer diameter is 25.8 cm. The length of the tubular body 10 is a length that makes it possible to ensure a reaction zone 12 having a length equal to about 1 or more times (typically, about 1 to 10 times) the inner diameter. The length of the tubular body 10 in the apparatus 1 of the present embodiment is about 200 cm, and the length of the reaction zone 12 is about 90 cm.

Approximately the central section of the tubular body 10 in the axial direction (the direction of the major axis) is surrounded by the heater 7, and a section located within this surrounded region is the reaction zone 12. The heater 7 is capable of heating the reaction zone 12 to a temperature suitable for forming CNT (typically, about 500° C. to 1000° C., preferably about 550° C. to 900° C., and for example, about 600° C. to 700° C.), and there are no particular limitations on this configuration or the heating method thereof. An example of the heater 7 that may be preferably used is an electric oven (and typically, a Nichrome wire heater). In the present embodiment, two electric ovens having a roughly semicircular cross-section are used as the heater 7, approximately the central portion of the tubular body 10 is surrounded by the electric ovens facing each other, and a small gap (for example, about 5 cm to 15 cm) is provided between the opposing portions of the two electric ovens so that this gap can be used as a view window for looking inside the tubular body 10.

The CNT-supporting base material introduction unit (CNT-supporting base material supply unit) 30 is equipped with a CNT-supporting base material storage tank 31, which stores the CNT-supporting base material P, and a screw feeder 34 disposed so as to extend from the CNT-supporting base material storage tank 31 through the upstream cover 3 of the reactor 2. This screw feeder 34 extends roughly parallel to the axis (major axis) of the tubular body from the upstream side 10a towards the downstream side of the tubular body 10, and the distal end thereof extends up to the vicinity of the upstream side of the reaction zone 12. The CNT-supporting base material P is conveyed at a prescribed speed from the CNT-supporting base material storage tank 31 through the screw feeder 34, and is introduced (for example, supplied) into the chamber 11 from a CNT-supporting base material introduction port 38 located at the input site of the base material (such as a carbonaceous base material or inorganic base material), which is provided on the distal end thereof according to the present embodiment.

As a result of inputting (supplying) the CNT-supporting base material P directly into the reaction zone 12 or to the vicinity thereof in this manner, a phenomenon can be prevented, in which the carbon source liquefies or solidifies due to an inadequately-heated CNT-supporting base material P contacting the carbon source vapor V. From this viewpoint, the input site of the CNT-supporting base material P (the location of the CNT-supporting base material introduction port 38) is preferably set at a location where the temperature inside the chamber 11, when the CNT are being produced (formed) on the surface of the base material, is higher than the boiling point of the carbon source used (for example, 250° C. or higher, and preferably 300° C. or higher, in case camphor is used as the carbon source).

The carbon source vapor supply unit 40 is equipped with a carbon source vapor storage tank 41 that stores the carbon source, and a carbon source introduction pipe 44 disposed so as to extend through the downstream cover 4 of the reactor 2.

This carbon source introduction pipe 44 extends roughly parallel to the axis (major axis) of the tubular body 10 from the downstream side 10b towards the upstream side of the tubular body 10, and extends to the upstream region 12a thereof by passing through the space inside the reaction zone 12. In case a carbon source is used that is a solid or liquid at normal temperatures (typically, 25° C.), it is preferable that, as shown in the example in FIG. 1, a carbon source vaporization chamber 42 is provided between the carbon source storage tank 41 and the carbon source introduction pipe 44, and that the carbon source from the carbon source supply tank 41 is vaporized by heating, for example, in this vaporization chamber 42 to form the carbon source vapor V, after which this vapor V is conveyed into the introduction pipe 44.

Here, in case a carbon source (such as powdered camphor) is used that is a solid at normal temperatures (typically, 25° C.), a transport unit 45 (such as a screw feeder) is provided between the carbon source supply tank 41 and the carbon source vaporization chamber 42. For example, a solid carbon source can be easily supplied to the carbon source vaporization chamber 42 by equipping the transport unit 45 with a solid transport means, such as a screw feeder.

In addition, in case a liquid material (liquid-based material) is used that is obtained by dissolving a carbon source (such as powdered camphor), which is a solid at normal temperatures, in an alcohol-based solvent (such as ethanol), the transport unit 45 is preferably constructed in the form of a transport pipe equipped with a not-illustrated pump. A liquid material containing the carbon source can be quantitatively supplied from the carbon source storage tank 41 to the carbon source vaporization chamber 42 by using the pump. Furthermore, there are no particular limitations on the pump provided in the transport unit 45, provided that it is able to supply a liquid material to the carbon source vaporization chamber 42.

Figure 4:
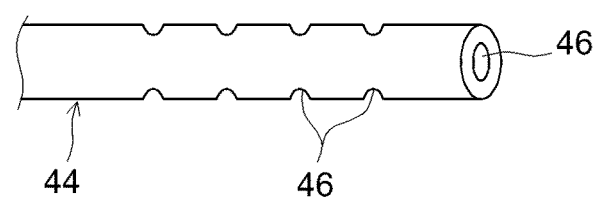
FIG. 4 is a schematic drawing showing an enlarged view of a section of the distal end of a carbon source introduction pipe.

As shown in FIG. 4, a total of nine through-holes, consisting of one in the distal end and eight (four pairs) disposed in the sidewall so as to oppose each other, are formed in the distal end of the carbon source introduction pipe 44 and in the sidewall near the distal end; the through-holes function as carbon source supply ports 46, which are the carbon source vapor supply sites according to the present embodiment where the carbon source vapor V is supplied (discharged) directly into the reaction zone 12. The carbon source supply ports 46 formed in the sidewall of the carbon source introduction pipe 44 are preferably provided at locations where they do not open directly upward into the chamber 11 (and preferably so that they open so as to face roughly horizontally or downward). In this case, the phenomenon can be prevented, in which the CNT-supporting base material P clogs the carbon source supply ports 46 as it falls downward from the protrusions 20. In addition, since the carbon source introduction pipe 44 extends through the reaction zone 12 to the upstream region 12a thereof, a decrease in the temperature of the carbon source vapor V inside the introduction pipe 44 can be prevented (that is, the temperature of the vapor V can be maintained). Moreover, a configuration may be employed in which the carbon source introduction pipe 44 is equipped with a heater (not shown), and the temperature of the carbon source vapor V in the introduction pipe 44 can be controlled (maintained) by the heater. According to this configuration, while the carbon source vapor V in the introduction pipe 44 is being supplied (discharged) from the carbon source supply ports 46 into the chamber 11, the temperature of the vapor V can be controlled more accurately (for example, maintained more reliably in the gaseous state).

The apparatus 1 according to the present embodiment is equipped with a carrier gas supply unit 50, which includes a first gas supply pipe 51 that passes through the upstream cover 3 of the reactor 2 and a second gas supply pipe 53 that passes through the downstream cover 4. A first gas supply port 52 provided on the distal end of the first gas supply pipe 51 opens into the upstream side 10a of the tubular body 10 (a location farther upstream from the CNT-supporting base material introduction port 38). A second gas supply port 54 provided on the distal end of the second gas supply pipe 53 opens into the downstream side 10b of the tubular body 10 (a location farther downstream than the reaction zone 12). A gas venting port 14 of a gas exhaust unit (gas exhaust pipe), which is configured to exhaust gas from the chamber 11, opens near the downstream side of the reaction zone 12 (at roughly the same location as the downstream end of the reaction zone 12). By setting the balance between the amount of non-oxidizing gas (carrier gas), which is supplied to the chamber 11 from each of the first gas supply port 52 and the second gas supply port 54, and the amount of gas discharged from the gas venting port 14 (which can contain, in addition to the above-mentioned carrier gas, reactive gas formed by thermal degradation of the carbon source vapor V as well as un-reacted carbon source vapor), movement of the carbon source vapor V can be controlled so that the carbon source vapor V does not diffuse towards the upstream side and downstream side of the reaction zone 12 (or in other words, so that the carbon source vapor V is retained in the reaction zone 12).

Furthermore, in order to better prevent the carbon source vapor V, which is supplied (discharged) from the carbon source supply ports 46 provided in the distal end of the carbon source introduction pipe 44, from going beyond the upstream end of the reaction zone 12 and reaching the upstream side due to its discharge force, the location of the distal end of the carbon source introduction pipe 44 is preferably disposed slightly downstream (for example, about 5 cm to 30 cm) from the upstream end of the reaction zone 12.

A recovery unit 60, which recovers the CNT-supporting base material P (since CNT, which have been formed, are typically present on the CNT-supporting base material P (such as by being supported or adhered thereto), this may be subsequently referred to as a "composite material") that has been conveyed inside the chamber 11 through the reaction zone 12 from the upstream side to the downstream side, is connected to the downstream cover 4 that covers the downstream side 10b of the tubular body 10. This recovery unit 60 is equipped with a shredder 62 that breaks up clumps (aggregates) in the composite material (such as a carbonaceous composite material or inorganic composite material) in the case clumps are present therein. The composite material that has reached the downstream end of the tubular body 10 is input into the shredder 62 by falling from the downstream end. An ordinary shredder used for the purpose of breaking up clumps (such as one of a type in which two cylinders are arranged in close proximity. in which a large number of shredding pins are embedded in the surface thereof, and which performs the shredding by rotating the cylinders in opposite directions while inputting the material to be shredded between the cylinders) can be suitably selected and used as the shredder 62. After passing through the shredder 62, the composite material passes through a transfer pipe 64 and is conveyed to an outlet port 66 while being cooled. A transfer pipe having a configuration, in which e.g., coaxial screws are housed in a hollow pipe, can be used as the transfer pipe 64. The outlet port 66 is equipped with two, spaced-apart valves 67. By opening and closing these valves, the CNT-supporting base material (such as a carbonaceous base material or inorganic base material) can be discharged to the outside without having to interrupt the operation of the apparatus 1 (namely, while continuing to operate the apparatus 1). Furthermore, the transfer pipe 64 may be configured to cool the contents contained therein (composite material) by air cooling, or may be equipped with means for forcibly cooling the contents (for example, with a typical rotary cooler). By passing the composite material through the shredder 62 prior to cooling, the clumps can be suitably broken up (for example, by suppressing damage to the carbonaceous base material and CNT).

The ambient temperature (namely, the CVD temperature) of the reaction zone 12 can be, for example, about 500° C. to 1000° C. From the viewpoint of CNT production efficiency, etc., the CVD temperature is preferably about 550° C. to 800° C., and more preferably is about 600° C. to 700° C. (for example, about 650° C.). If the CVD temperature is higher or lower than the above-mentioned temperature range, the CNT production efficiency (for example, yield per unit time, yield per unit weight of the catalyst metal, or yield with respect to weight of the carbon source (camphor) used) tends to decrease.

In addition, although there are no particular limitations thereon, normally the ambient pressure of the reaction zone 12 is suitably about $1 \times 10^3$ Pa (about 7.5 Torr) to about $200 \times 10^3$ Pa (about 1500 Torr). If the ambient pressure is below the above-mentioned range, the CNT production efficiency tends to decrease, while if the ambient pressure is above the above-mentioned range, production costs increase. From these viewpoints, an ambient pressure of, for example, about $10 \times 10^3$ Pa to about atmospheric pressure (about 75-760 Torr) preferably can be used. The invention disclosed herein can be preferably carried out in one aspect, in which the internal pressure of the reactor 2 (the ambient pressure of the chamber 11) is, for example, roughly at atmospheric pressure.

It is appropriate to use a non-oxidizing gas as the carrier gas supplied to the chamber 11 from the first gas supply port 52 and the second gas supply port 54. In other words, one type or two or more types of gas selected from inert gases and reducing gases is preferably used as the carrier gas. Examples of inert gases include argon (Ar) gas, nitrogen ($N_2$) gas and helium (He) gas. Examples of reducing gases include hydrogen ($H_2$) gas and ammonia ($NH_3$) gas. In a preferable aspect of the production process disclosed herein, an inert gas (such as $N_2$ gas) is used as the carrier gas. In another preferable aspect, a mixed gas including an inert gas (such as $N_2$ gas) and a reducing gas (such as $H_2$ gas) is used as the carrier gas. The mixing ratio of the inert gas and reducing gas in the mixed gas can be such that, for example, the volume ratio of the inert gas to the reducing gas is about 99:1 to 50:50, and is preferably about 95:5 to 80:20.

In addition, the amounts of the carrier gas supplied from each of the first gas supply port 52 and the second gas supply port 54 are preferably balanced so that the carbon source vapor V (such as camphor vapor) does not diffuse into the upstream side and downstream side of the reaction zone 12. Taking into account a balance with the amount of gas being discharged from the gas venting port 14, the total amount of carrier gas supplied from both of the gas supply ports 52 and 54 can be a flow rate of an amount such that the period of time, in which the camphor vapor, for example, remains in the reaction zone 12, is about 1 minute to 60 minutes (and preferably about 3 minutes to 30 minutes).

Furthermore, the apparatus 1 according to the present embodiment can be configured so that vapor of the carbon source (such as camphor) vaporized in the carbon source vaporization chamber 42 is supplied to the chamber 11 through the introduction pipe 44 together with the carrier gas (preferably a non-oxidizing gas as described above can be used). For example, a gas (such as $N_2$ gas) containing camphor at a concentration of about 30% by volume to about 50% by volume is discharged from the carbon source supply ports 46. Alternatively, highly-concentrated carbon source vapor V (such as camphor vapor) may be discharged from the carbon supply ports 46 without using a carrier gas.

Although the following provides a detailed explanation of a preferable mode for producing a composite material using the above-mentioned materials and the above-mentioned production apparatus by utilizing the case, in which camphor is used as the carbon source, as an example, the carbon source in the present invention is not intended to be limited to camphor.

The camphor (such as solid camphor) used as the carbon source is vaporized by heating in the carbon source vaporization chamber 42, and the resulting camphor vapor (carbon source vapor V) is supplied directly from the carbon source supply support 46 to the upstream region of the reaction zone 12 through the carbon source introduction pipe 44. When vaporizing the camphor in the carbon source vaporization chamber 42, the heating temperature can be, for example, about 150° C. or higher (and typically, about 150° C. to 300° C.), and normally is preferably about 200° C. or higher (typically, about 200° C. to 250° C., and for example, about 230° C.). In this case, the camphor vapor can be conveyed more suitably from the vaporization chamber 42 into the introduction pipe 44.

The carbon source vapor supply unit 40 is configured to supply (replenish) solid camphor from the inside of the carbon source storage tank 41 to the carbon source vaporization chamber 42. The solid camphor used is preferably prepared in the form of particles (for example, particles having a mean diameter of about 1 μm to 100 μm). Such particulate solid camphor is preferable since it facilitates the operation of transferring from the carbon source storage tank 41 to the carbon source vaporization chamber 42, and is suitable for stable and efficient vaporization.

Figure 5:
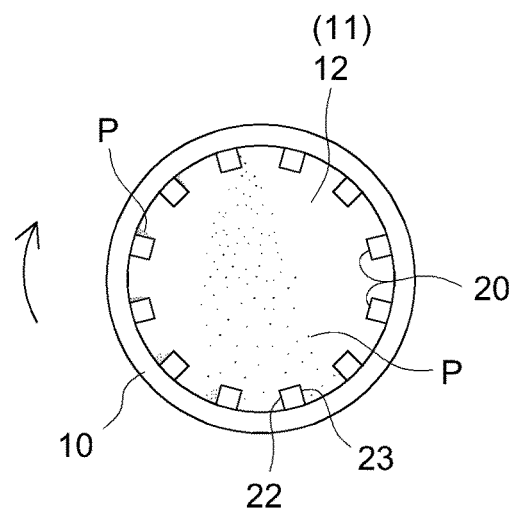
FIG. 5 is a schematic drawing for explaining the movement of a base material due to the rotation of the tubular body.

The tubular body 10, which is disposed horizontally with the axis inclined by about 5° to 7° from the horizontal, is rotated about its axis at a speed of, for example, about 0.2 rpm to 2 rpm while supplying the CNT-supporting base material P and the camphor vapor (carbon source vapor V) from the CNT-supporting base material introduction port 38 and the carbon source supply ports 46, respectively, which are disposed at the above-described locations, into the reaction zone 12, which has been adjusted to the above-mentioned temperature and pressure. In this case, as shown in FIGS. 1 and 5, the CNT-supporting base material P (here, a carbonaceous base material (CF) is used that has been provided (such as by being adhered) with a catalyst-containing inorganic base material (such as zeolite) on the surface thereof), which has been discharged from the CNT-supporting base material introduction port 38 and has fallen onto the inner peripheral wall of the tubular body 10 (chamber 11), is caught (entrapped) on the front surface 22 of the protrusions 20 and is lifted up; when it rotates further, the lifted CNT-supporting base material P falls from the apexes (the ends of the inside diameter side of the tubular body 10) of the protrusions 20 and drops through the space in the reaction zone 12. By being repeatedly lifted up and dropped, the camphor vapor (carbon source vapor V) and CNT-supporting base material P are effectively brought into contact in the reaction zone 12, thereby enabling CNT (and typically, mainly multi-walled CNT) to be efficiently formed from the camphor vapor on the surface of the CNT-supporting base material P.

Here, since the tubular body 10 is disposed in an inclined manner so that the downstream side is lower than the upstream side, the CNT-supporting base material P gradually moves through the reaction zone 12 to the downstream side while being repeatedly lifted up and dropped as described above, after which it falls from the downstream end of the tubular body 10 and is led into the recovery unit 60. Although there are no particular limitations on the amount of time until the CNT-supporting base material P, which is supplied from the CNT-supporting base material introduction port 38 into the chamber 11, reaches the downstream end of the reaction zone 12 (that is, the time that the CNT-supporting base material P is retained in the reaction zone 12), normally the time is suitably about 1 minute to 30 minutes, and preferably about 2 minutes to 10 minutes (for example, about 5 minutes). If this retention time is excessively short, the utilization efficiency of the CNT-supporting base material P tends to decrease, while if the retention time is excessively long, the amount of composite material that is recovered per unit time may decrease or production efficiency tends to decrease. A composite material obtained in the manner described above is a composite material in which an inorganic composite material (inorganic base material having the formed CNT on the surface thereof) is adhered to the surface of a carbonaceous base material.

According to a preferable aspect of the composite material production process disclosed herein, a yield of about 50% or more (and further, 70% or more) can be realized based on the weight of the carbon atoms contained in the carbon source (camphor) used. According to a more preferable aspect, a yield of about 85% or more (for example, 90% or more, and typically 90% to 99.9%) can be realized. In other words, carbon atoms contained in the carbon source can be converted into CNT (and typically, multi-walled CNT) at the weight ratio described above.

The above-mentioned composite material typically has a composition in which a base material (for example, a carbonaceous base material or inorganic base material) is covered by a carbonaceous product containing CNT. According to the present invention, a composite material can be obtained in which the majority of the carbon contained in the carbonaceous product forms CNT (that is, it has a low content of amorphous carbon). According to a preferable aspect thereof, a composite material can be produced in which the carbonaceous product is substantially free of amorphous carbon (for example, the content of CNT in the carbonaceous product is about 90% by weight or more, and preferably 95% by weight or more). Furthermore, the formation of the CNT by the majority of the carbonaceous product can be confirmed, for example, by thermogravimetric analysis (TGA).

Although the following provides an explanation of several examples of the present invention, the present invention is not intended to be limited to those indicated in the specific production examples. Explanations are provided of examples for the case that an inorganic base material is used as the base material (Example 1), the case that a carbonaceous base material is used as the base material (Examples 2 and 3), and the case that an inorganic base material and a carbonaceous base material are simultaneously used (Example 4). More specifically, the materials indicated in Table 1 were used.

TABLE 1

|  | Base Material | Carbon Source | Catalyst |
| --- | --- | --- | --- |
| Example 1 | Zeolite | Camphor | Fe + Co |
| Example 2 | Carbon fiber | Camphor | Fe + Co |
| Example 3 | Ketjen black | Camphor | Fe + Co |
| Example 4 | Carbon fiber + zeolite | Camphor | Fe + Co |
| Comp. Ex. 1 | Carbon fiber | None | None |
| Comp. Ex. 2 | Carbon fiber | None | Fe + Co |
| Comp. Ex. 3 | Carbon fiber | None | None |

Example 1

Preparation of Carbon Source (Camphor)

Camphor manufactured by Shimada Chemical Co., Ltd. (purity: 96%) was prepared in the form of a powder having a particle diameter of 1 μm to 100 μm and was used as the carbon source. In the present example, 1568 g of camphor were used.

(Preparation of CNT-Supporting Base Material (1))

13.5 g of iron nitrate (IN) and 6 g of cobalt acetate tetrahydrate (CA) were dissolved in 300 cm$^3$ of water. As an inorganic base material (inorganic porous material), 5 g of zeolite powder (Tosoh Corp., Y-type zeolite, trade name: "HSZ-390HUA", cation type: H, Si/Al ratio: 200, mean particle diameter: 1 μm to 2 μm) were added to this aqueous solution, followed by treating with ultrasonic waves for 10 minutes, freeze-drying and finely pulverizing to obtain a CNT-supporting base material (1) in which IN and CA were supported on the zeolite powder at the above-described weight ratio. This procedure was carried out 8 times (8 batches) to prepare 196 g of the CNT-supporting base material (1). This CNT-supporting base material (1) was subsequently heat-treated at 230° C.

The CNT were produced by supplying the camphor prepared in the manner described above and the heat-treated CNT-supporting base material (1) to the apparatus 1 according to the above-described embodiment. The inclination angle of the tubular body 10 was set to 5°. The heating temperature of the camphor in the vaporization chamber 42 was set to 230° C. The temperature within the reaction zone 12 was adjusted to 650° C. while supplying $N_2$ gas (carrier gas) at total flow rate of 8600 cm$^3$/minute from the first and second gas supply ports 52 and 54. At this time, the pressure inside the chamber 11 was roughly maintained at atmospheric pressure by opening the gas venting port 14. In addition, the carbon source introduction pipe 44 was maintained at a temperature of 300° C. or higher over the entire length thereof by operating a heater (not shown) disposed around the outer periphery of the carbon source introduction pipe 44.

In addition to continuously supplying the above-mentioned aliquot of the CNT-supporting base material P from the CNT-supporting base material introduction port 38 while rotating the tubular body 10 at a speed of 0.5 rpm over the course of 1 hour, camphor vapor V, which was obtained by vaporizing the above-mentioned aliquot of camphor, was continuously supplied from the carbon source supply ports 46 together with the carrier gas ($N_2$ gas) over the course of 1 hour. As a result, the CNT-supporting base material P supplied to the chamber 11 reached the lower end of the reaction zone 12 in about 5 minutes while being repeatedly lifted up and dropped by the protrusions 20, and continued to move towards the downstream side where it was led into the recovery unit 60. After passing through the shredder 62 and the transfer pipe 64 of the recovery unit 60, the weight of the inorganic composite material (namely, an inorganic base material having CNT on the surface thereof) obtained from the outlet port 66 was about 1.2 kg. This result means that roughly 50% by weight of the carbon atoms contained in the camphor used were recovered as an inorganic composite material. This result agrees with the finding that hardly any un-reacted camphor vapor was contained in the gas discharged from the gas venting port 14.

The above-mentioned inorganic composite material contained a carbonaceous product and CNT-supporting base material at a weight ratio of about 9:1 (about 99:1 in terms of volume ratio). In addition, according to the results of the TGA, the majority (about 90% by weight) of the carbonaceous product consisted of highly conductive multi-walled CNT, and it was confirmed to be substantially free of amorphous carbon. That is, according to the present example, about 1.2 kg of inorganic composite material (containing about 1 kg of CNT) was produced at a yield of about 50% (based on the weight of the carbon atoms) by continuously operating for 1 hour. Furthermore, when each component of the apparatus 1 was inspected following completion of the continuous operation, precipitation of camphor was not observed on the inner wall of the reactor 2 or in the carbon source introduction pipe 44, etc. This result suggests that the apparatus 1 can be continuously operated for a long period of time (and typically, for 3 hours or more, and for example, 8 hours or more) in a suitable manner.

Figure 6:
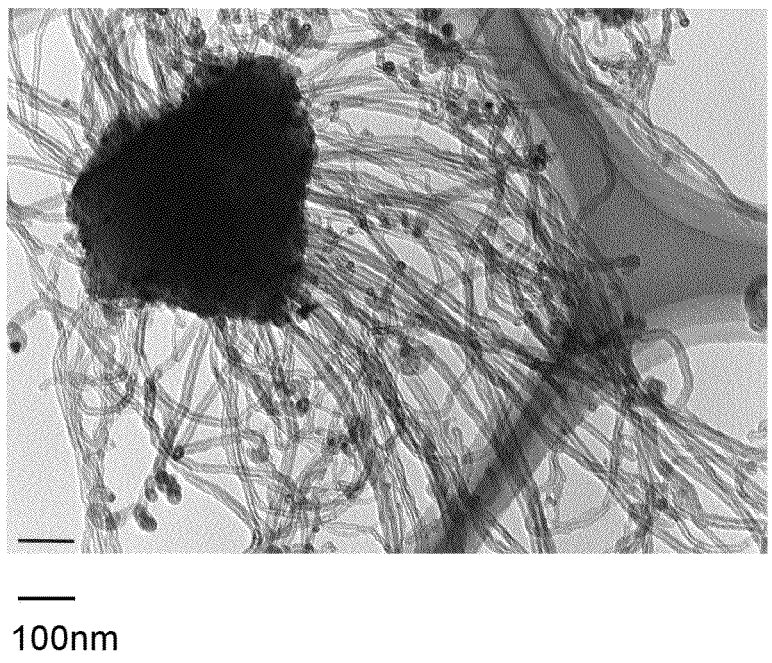
FIG. 6 is a TEM (transmission electron micrograph) of an inorganic composite material according to Example 1.

In addition, a TEM (transmitting electron micrograph) of the inorganic composite material (1) obtained in Example 1 is shown in FIG. 6. As is clear from FIG. 6, CNT can be seen to be formed (adhered) in a satisfactory manner on the surface of the zeolite serving as the inorganic base material.

As has been described above, according to the apparatus 1 of the present embodiment, an inorganic composite material provided with CNT on the surface of an inorganic base material was confirmed to be producible extremely efficiently (at high purity, high yield and high productivity) from camphor used as the carbon source.

Example 2

Preparation of Carbon Source (Camphor)

The same camphor as that used in Example 1 was used as the carbon source.

(Preparation of Carbonaceous Base Material (2))

Milled carbon fiber manufactured by Masuoka Ceramic Materials Co., Ltd. was used as the carbonaceous base material. As determined by SEM observation, the mean diameter of this carbon fiber (CF) was 5 µm to 10 µm. In addition, the mean length was about 1 mm or less (mean length: about 0.1 mm to 0.3 mm).

(Preparation of CNT-Supporting Base Material (2))

Iron (II) acetate (IA) (or iron nitrate (IN)) and cobalt acetate tetrahydrate (CA) were dissolved (dispersed) in water at the prescribed mixing ratio. The above-mentioned carbonaceous base material (2) was added to this aqueous solution to prepare a composition containing IA (the amount as IA in case IN is used), CA and CF at a weight ratio of 1:1:8. After treating this composition with ultrasonic waves for 10 minutes, the composition was freeze-dried and finely pulverized to obtain a CNT-supporting base material according to the present example, in which the above-mentioned Fe catalyst and Co catalyst were supported on the carbonaceous base material (2) at the above-mentioned weight ratio. This CNT-supporting base material was subsequently heat-treated at 150° C. or more to 250° C. or less (here, 230° C.).

The camphor prepared as described above and the heat-treated CNT-supporting base material (2) were supplied to the apparatus 1 according to the above-described embodiment to produce a carbonaceous composite material (2) under the same conditions as Example 1.

Example 3

Preparation of Carbon Source (Camphor)

The same camphor as used in Example 1 was used as the carbon source.

(Preparation of Carbonaceous Base Material (3))

Commercially available Ketjen black (KB) was used as the carbonaceous base material according to the present example.

(Preparation of CNT-Supporting Base Material (3))

Iron (II) acetate (IA) (or iron nitrate (IN)) and cobalt acetate tetrahydrate (CA) were dissolved (dispersed) in water at the prescribed mixing ratio. The above-mentioned carbonaceous base material (3) was added to this aqueous solution to prepare a composition containing IA (the amount as IA in case IN is used), CA and CF at a weight ratio of 1:1:8. After treating this composition with ultrasonic waves for 10 minutes, the composition was freeze-dried and finely pulverized to obtain a CNT-supporting base material according to the present example, in which the above-mentioned Fe catalyst and Co catalyst were supported on the carbonaceous base material (3) at the above-mentioned weight ratio. This CNT-supporting base material was subsequently heat-treated at 150° C. or more to 250° C. or less (here, 230° C.).

The camphor prepared as described above and the heat-treated CNT-supporting base material (3) were supplied to the apparatus 1 according to the above-described embodiment to produce a carbonaceous composite material (3) under the same conditions as Example 1.

Comparative Example 1

In this comparative example, the carbonaceous base material (milled carbon fiber) prepared in Example 2 was prepared without carrying out the above-mentioned catalyst supporting treatment, and treatment was carried out in the same manner as Example 2 with the exception of not supplying a carbon source vapor (camphor vapor) to obtain a sample, on which catalyst and CNT were not supported (carbon fiber only).

Comparative Example 2

In this comparative example, the carbonaceous base material (milled carbon fiber) used in Example 2 was subjected to the above-mentioned catalyst supporting treatment in the same manner as Example 2, and treatment was carried out in the same manner as Example 2 with the exception of not supplying a carbon source vapor (camphor vapor) to obtain a sample, on which CNT were not supported (catalyst-containing carbon fiber).

Figure 7:
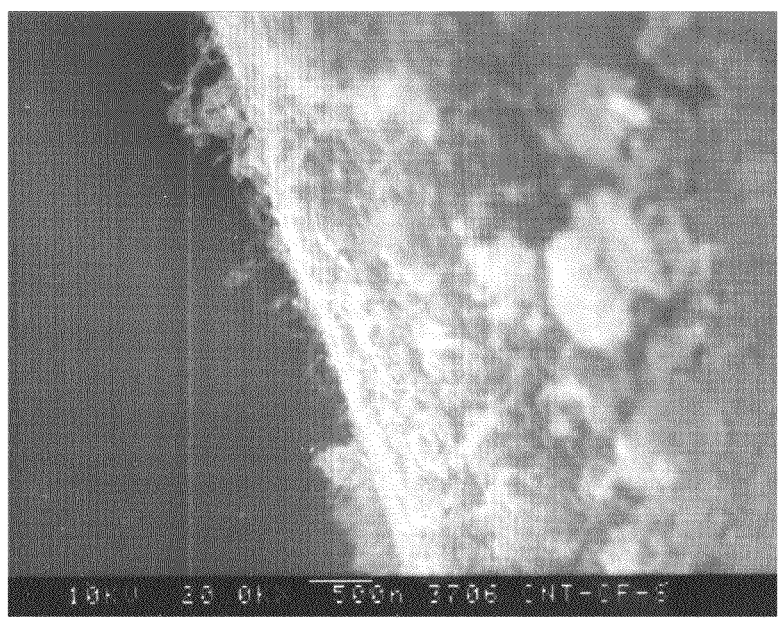
FIG. 7 is a SEM (scanning electron micrograph) of a carbonaceous composite material according to Example 2.
Figure 8:
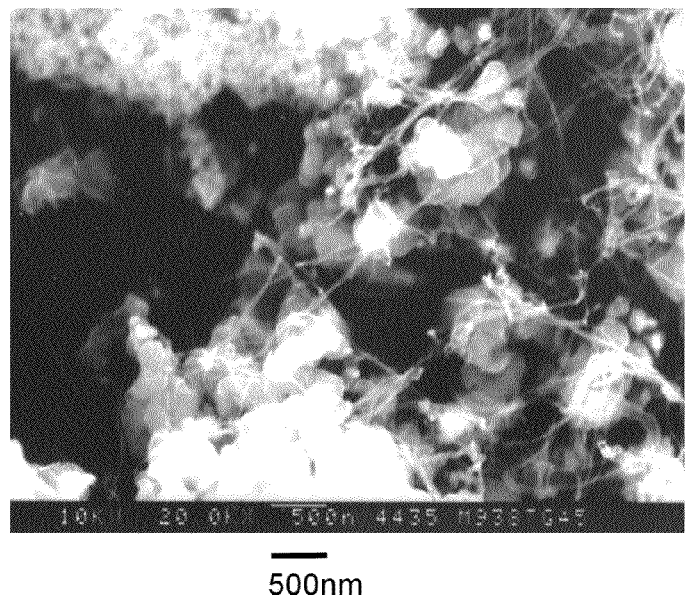
FIG. 8 is a SEM (scanning electron micrograph) of a carbonaceous composite material according to Example 3.

Scanning electron micrographs (SEM) of the carbonaceous composite materials (2) and (3) obtained in Examples 2 and 3 are respectively shown in FIGS. 7 and 8. As is clear from FIGS. 7 and 8, CNT can be seen to be formed (supported or adhered) in a satisfactory manner on the surface of the carbon fiber and the Ketjen black, which served as the carbonaceous base materials.

Electrical resistance of each of the samples obtained in Examples 2 and 3 and Comparative Examples 1 and 2 (aggregates of carbonaceous base material or CNT-supporting composite materials) was measured using a simple two probe technique. That is, electrical resistance values of the samples were measured by placing a clump of each sample between a pair of probe terminals (equipped with a brass cylindrical rod and a flat probe terminal portion) provided by a commercially-available electrical resistance meter (Digital Multimeter, Advantest Corp.).

Furthermore, clumps of samples having weights of 2 g, 4 g, 6 g, 8 g, 10 g, 12 g, 14 g, 16 g, 18 g and 20 g were used when measuring the samples according to Examples 2 and 3 (carbonaceous composite materials (2) and (3)), and measurements with the above-mentioned meter were carried out a total of 3 times on each sample, followed by determination of the average electrical resistance ($\Omega$) thereof.

In addition, clumps of samples having weights of 2 g, 4 g, 6 g, 8 g and 10 g were used when measuring the samples according to Comparative Examples 1 and 2, and measurements with the above-mentioned meter were carried out a total of 3 times on each sample, followed by determination of the average electrical resistance ($\Omega$) thereof.

TABLE 2

|  | Weight (mg) | Average R ($\Omega$) |
|---|---|---|
| Blank |  | 0.12 |
| Example 2 | 2 | 0.25 |
|  | 4 | 0.30 |
|  | 6 | 0.35 |
|  | 8 | 0.37 |
|  | 10 | 0.40 |
|  | 12 | 0.46 |
|  | 14 | 0.50 |
|  | 16 | 0.55 |
|  | 18 | 0.58 |
|  | 20 | 0.65 |
| Example 3 | 2 | 0.25 |
|  | 4 | 0.29 |
|  | 6 | 0.28 |
|  | 8 | 0.29 |
|  | 10 | 0.32 |
|  | 12 | 0.32 |
|  | 14 | 0.37 |
|  | 16 | 0.37 |
|  | 18 | 0.40 |
|  | 20 | 0.45 |
| Comparative Example 1 | 2 | 0.55 |
|  | 4 | 0.62 |
|  | 6 | 0.71 |
|  | 8 | 0.82 |
|  | 10 | 0.91 |
| Comparative Example 2 | 2 | 1.47 |
|  | 4 | 1.54 |
|  | 6 | 1.65 |
|  | 8 | 1.84 |
|  | 10 | 2.02 |

Figure 9:
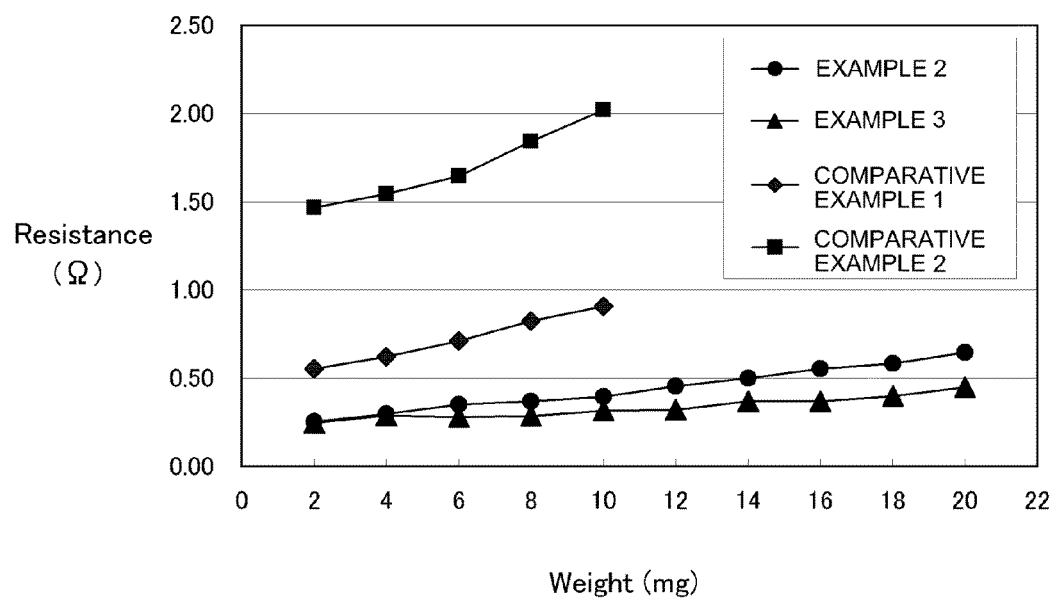
FIG. 9 is a line graph showing mean electrical resistance values versus the masses of composite materials according to examples and comparative examples, wherein mass (mg) is plotted on the horizontal axis and electrical resistance (Ω) is plotted on the vertical axis.

Measurement results are shown in Table 2, while a graph of average electrical resistance ($\Omega$) measured for each sample (the weight (mg) of each sample is plotted along the horizontal axis) is shown in FIG. 9.

As is clear from Table 2 and FIG. 9, due to the presence of CNT on the surface of the carbonaceous base material, the electrical resistance of the sample according to Example 2 (namely, carbonaceous composite material using carbon fiber as the base material) and the sample according to Sample 3 (namely, carbonaceous composite material using Ketjen black as the base material) can be seen to be considerably lower than (roughly half of) the electrical resistance of each of the samples of the comparative examples in which CNT are not present.

That is, according to the examples described above, a carbonaceous composite material, in which CNT are formed and present (such as by being supported or adhered) on the surface of a carbonaceous base material, exhibited improved electrical conductivity that is roughly twice that of the case of a carbonaceous base material only, in which CNT are not formed on the surface thereof (or a carbonaceous base material, in which only a catalyst is supported on the surface thereof). As has been described above, as a result of carrying out the production process according to the present embodiment using the apparatus 1 of the present embodiment, a carbonaceous composite material can be produced that exhibits remarkably improved electrical conductivity as compared to the original carbonaceous base material. Moreover, according to the production process of the present embodiment, CNT can be formed or adhered (for example, supported) on the surface of a carbonaceous base material (and typically, a fibrous or particulate base material) extremely efficiently (at high purity, high yield and high productivity) as a result of using inexpensive camphor as the carbon source. In addition, the carbonaceous composite material produced can be used in various industrial fields by utilizing its high electrical conductivity. For example, the carbonaceous composite material is useful as an electrode material (active substance, conductor, etc.) of a battery or capacitor.

Example 4

Preparation of Carbon Source (Camphor)

The same camphor as used in Example 1 was used as the carbon source.

(Preparation of Carbonaceous Base Material)

The same CF as used in Example 2 was used as the carbonaceous base material.

(Preparation of CNT-Supporting Base Material (4))

13.5 g of iron nitrate (IN) and 6 g of cobalt acetate tetrahydrate (CA) were added to 100 cm$^3$ of water and dissolved by carrying out ultrasonic treatment. 5 g of the same zeolite powder as was used in Example 1 were added to this aqueous solution. The aqueous solution was stirred and heat-dried with a spray dryer and a heating mantle at 100° C. to 250° C. and then finely pulverized to obtain a CNT-supporting inorganic base material (zeolite catalyst) in which IN and CA were supported (adhered) on the zeolite powder at the above-mentioned weight ratio. The carbonaceous base material and the CNT-supporting inorganic base material were then weighed so as to achieve a weight ratio of 100:1, followed by addition of these materials to water. After heating and stirring the aqueous solution with a mixer, the water was evaporated to obtain a CNT-supporting base material (4), in which the CNT-supporting inorganic base material was adhered to (supported on) CF.

Figure 10:
FIG. 10 is a SEM (scanning electron micrograph) of a composite material according to Example 3.
Figure 11:
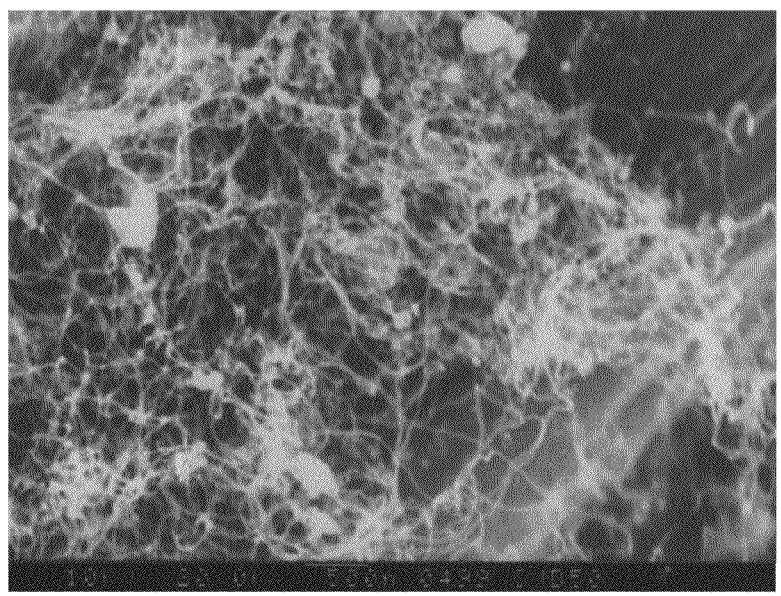
FIG. 11 is a SEM (scanning electron micrograph) of a composite material according to Example 3.

The camphor prepared as described above and the CNT-supporting base material (4) were supplied to the apparatus 1 according to the above-described embodiment to produce a composite material (4) under the same conditions as Example 1. Scanning electron micrographs (SEM) of the composite material (4) obtained in Example 4 are respectively shown in FIGS. 10 and 11. As is clear from FIGS. 10 and 11, CNT can be seen to be formed (supported or adhered) in a satisfactory manner on the surface of the zeolite serving as an inorganic base material, and the CNT-applied zeolite can be seen to be adhered (supported) to the surface of the CF.

Comparative Example 3

In this comparative example, the carbonaceous base material (carbon fiber) used in Example 2 was prepared. A sample was obtained on which metal catalyst and CNT were not supported (carbon fiber only).

Each of the samples obtained in Example 4 and Comparative Example 3 was measured to determine electrical resistivity (Ωcm).

Electricity resistivity of each of the samples obtained in Example 4 and Comparative Example 3 was measured using a simple two probe technique. That is, electrical resistivity was measured by placing a clump of each sample between a pair of probe terminals (equipped with a brass cylindrical rod and a flat probe terminal portion) provided by a commercially-available electrical resistance meter (Digital Multimeter, Advantest Corp.).

Furthermore, with respect to the samples according to Example 4 (composite material (4)) and Comparative Example 3, samples, which were obtained by press-forming into the shape of a disk having a diameter of 10 mm and thickness of 1 mm, were used as the measured sample clumps, and electrical resistivity (Ωcm) was determined by measuring each of the sample clumps with the above-mentioned meter.

TABLE 3

| | Electrical Resistivity (Ωcm) |
|---|---|
| Example 4 | 0.6 |
| Comparative Example 3 | 4 |

Measurement results are shown in Table 3. As is clear from Table 3, the sample according to Example 4 (namely, the composite material, in which zeolite provided with CNT on the surface thereof is adhered to the surface of the carbon fiber) can be seen to have considerably lower electrical resistivity than the sample according to Comparative Example 3 (namely, carbon fiber in which CNT are not present). That is, the composite material according to the present example was confirmed to have remarkably improved electrical conductivity as compared to conventional carbon fiber.

INDUSTRIAL APPLICABILITY

According to the present invention, a composite material (such as a carbonaceous composite material or inorganic composite material) can be produced, in which highly conductive, multi-walled CNT are formed at high purity on the surface of a base material (such as a carbonaceous base material or inorganic base material). This composite material can be useful as an electrode material (such as an active substance or conductor) of a battery, a capacitor, etc. In addition to such electrode materials, the composite materials obtained by applying the present invention can be preferably used, for example, as various types of conductivity-imparting agents or rubber additives.

According to an exemplary embodiment of the present invention, a composite material is primarily produced in the form of a CNT-supporting base material. In addition, a method using chemical treatment (such as dissolving and removing zeolite by treating an inorganic composite material, which was obtained using zeolite as the inorganic base material, with an aqueous NaOH solution) or a method using physical treatment such as ultrasonic vibration, for example, can be suitably employed to separate the CNT from the inorganic base material.

EXPLANATION OF THE REFERENCE NUMERALS

| | |
|---|---|
| 1 | Composite material production apparatus |
| 2 | Reactor |
| 3 | Upstream cover |
| 4 | Downstream cover |

-continued

EXPLANATION OF THE REFERENCE NUMERALS

| | |
|---|---|
| 6 | Rotary driving mechanism |
| 7 | Heater |
| 10 | Tubular body |
| 10a | One end (upstream side) |
| 10b | Other end (downstream side) |
| 11 | Chamber |
| 12 | Reaction zone |
| 13 | Transmission member |
| 14 | Gas venting port |
| 20 | Protrusion |
| 22 | Protrusion front surface |
| 23 | Protrusion rear surface |
| 30 | CNT-supporting base material introduction unit (CNT-supporting base material supply unit) |
| 31 | CNT-supporting base material storage tank |
| 34 | Screw feeder |
| 38 | CNT-supporting base material introduction port |
| 40 | Carbon source vapor supply unit |
| 41 | Carbon source storage tank |
| 42 | Carbon source vaporization chamber |
| 44 | Carbon source introduction pipe |
| 45 | Transport unit |
| 46 | Carbon source supply port |
| 50 | Carrier gas supply unit |
| 51 | First gas supply pipe |
| 52 | First gas supply port |
| 53 | Second gas supply pipe |
| 54 | Second gas supply port |
| 60 | Recovery unit |
| 62 | Shredder |
| 64 | Transfer pipe |
| 66 | Outlet port |
| 67 | Valve |
| P | CNT-supporting base material |
| V | Carbon source vapor |

The invention claimed is:

1. A process for producing a composite material having carbon nanotubes present on a surface of a base material using an apparatus that comprises:

a hollow body defining an elongated chamber that is configured to have a gas flow through it and is heatable, wherein the hollow body is rotatable about a major axis and is inclined such that an upstream side on one end of the hollow body in the direction of the major axis is higher than a downstream side of the hollow body on the other end, an introduction site configured to input the base material into the chamber, a supply site configured to input a carbon source vapor into the chamber, the introduction site and the supply site being arranged so that contact between the base material and the carbon source vapor occurs in a reaction zone disposed in at least one upstream portion of the elongated chamber in the direction of the major axis, and a plurality of ribs disposed on at least one inner peripheral wall of the hollow body at least within a portion of the elongated chamber adjacent to the reaction zone, wherein the process comprises:

inputting the base material, which already has a catalyst disposed on its surface, into the chamber of the hollow body via the introduction site;

supplying the carbon source vapor, which is comprised of a carbon source capable of forming the carbon nanotubes on the base material, via the supply site, and moving the base material from the upstream side to the downstream side by rotating the hollow body about the major axis, wherein base material disposed on the at least one inner peripheral wall is caught on the ribs and is lifted up and then is dropped such that the base material and the carbon source vapor make contact in the reaction zone.

2. The process according to claim 1, further comprising:
supplying the carbon source vapor directly into the reaction zone, and
preventing the carbon source vapor from flowing out to an upstream side or to a downstream side of the reaction zone by supplying a non-oxidizing gas into the chamber from locations upstream and downstream of the reaction zone and by discharging gas from the reaction zone or from a location in close proximity thereto.

3. The process according to claim 1, wherein the base material comprises an inorganic base material.

4. The process according to claim 3, wherein the inorganic base material comprises an inorganic porous material.

5. The process according to claim 1, wherein the base material comprises a carbonaceous base material comprised of a carbonaceous material.

6. The process according to claim 5, wherein the base material further comprises an inorganic base material.

7. The process according to claim 5, wherein the carbonaceous base material comprises carbon fibers having a mean diameter of 100 μm or less, and wherein the process produces a composite carbonaceous fiber material having carbon nanotubes present on the surface of the carbon fibers.

8. The process according to claim 5, wherein the carbonaceous base material comprises carbon black having a mean particle diameter of 1 μm or less, and wherein the process produces a composite carbonaceous powder material having carbon nanotubes are present on the surface of the carbon black.

9. The process according to claim 5, wherein the catalyst comprises iron and cobalt as a catalyst metal component, and the catalyst metal component comprises 1-30% by weight of a total weight of the carbonaceous base material and the catalyst metal component disposed the surface of the carbonaceous base material.

10. The process according to claim 9, further comprising:
supplying the carbon source vapor directly into the reaction zone, and
preventing the carbon source vapor from flowing out to an upstream side or to a downstream side of the reaction zone by supplying a non-oxidizing gas into the chamber from locations upstream and downstream of the reaction zone and by discharging gas from the reaction zone or from a location in close proximity thereto,
wherein the base material comprises at least one of an inorganic base material and a carbonaceous base material comprised of a carbonaceous material,
the carbon source is a liquid comprising camphor dissolved in an alcohol-based solvent, and
the carbon source vapor comprises camphor vapor.

11. The process according to claim 1, wherein the carbon source comprises a carbon-containing material in a form that is capable of producing carbon nanotubes in a chemical vapor deposition process, the carbon-containing material being a solid at room temperature.

12. The process according to claim 11, wherein the carbon-containing material comprises camphor.

13. The process according to claim 12, wherein the carbon source is a liquid comprising camphor dissolved in an alcohol-based solvent, and wherein the carbon source vapor comprises camphor vapor.

14. The method according to claim 1, wherein the ribs extend in the direction of the major axis of the hollow body and are disposed at intervals in a circumferential direction of the hollow body.

15. The method according to claim 1, wherein the ribs project from the at least one inner peripheral wall of the hollow body and have a first end spaced from a second end in the direction of the major axis.

16. A process for producing a composite material having carbon nanotubes present on a surface of a base material, the base material having a catalyst on a surface, the process comprising:
providing an apparatus that includes a hollow body defining an elongated chamber configured to have a gas flow therethrough and being heatable, the hollow body being mounted for rotation about a major axis and being inclined, the apparatus including an introduction site configured for inputting the base material into the chamber and a supply site configured for inputting a carbon source vapor into the chamber, the introduction site and the supply site being arranged so that contact between the base material and the carbon source vapor occurs in a reaction zone, and the apparatus having a plurality of ribs disposed on at least one inner peripheral wall of the hollow body at least within a portion of the elongated chamber adjacent to the reaction zone,
inputting the base material into the chamber of the hollow body via the introduction site;
supplying the carbon source vapor via the supply site, and
rotating the hollow body about the major axis to move the base material along the inclined hollow body, to lift the base material on the ribs and to drop the base material from the ribs such that the base material and the carbon source vapor make contact in the reaction zone.

17. An apparatus capable of producing a composite material having carbon nanotubes present on a surface of a base material, comprising:
a hollow body rotatable about a major axis and disposed such that the major axis is inclined with an upstream side of the hollow body on one end of the major axis being higher than a downstream side of the hollow body on the other end,
an elongated chamber comprising a reaction zone defined within the hollow body over at least one longitudinal section of the elongated chamber along the major axis,
a plurality of ribs disposed on at least one inner peripheral wall of the hollow body in at least a portion of the elongated chamber that is adjacent to the reaction zone,
an input device configured to input the base material into the chamber via a base material introduction port,
a carbon source vapor supply device configured to supply a carbon source vapor into the chamber via a carbon source supply port, and
a heater configured to heat at least the reaction zone to a temperature at which carbon nanotubes form from the carbon source vapor,
wherein the ribs are configured to catch base material disposed on the inner peripheral wall of the hollow body when the hollow body rotates and then drop the base material through the reaction zone so that the base material contacts the carbon source vapor.

18. The apparatus according to claim 17, wherein the ribs extend in the direction of the major axis of the hollow body, and are disposed at intervals in a circumferential direction of the hollow body.

19. The apparatus according to claim 17, wherein the carbon source supply port is disposed in the reaction zone or in close proximity thereto.

20. The apparatus according to claim 17, wherein the carbon source vapor supply device comprises a carbon source introduction pipe that at least partially extends through the reaction zone and is continuous with the carbon source supply port.

21. The apparatus according to claim 17, further comprising:
   a gas supply unit configured to supply non-oxidizing gas into the chamber from a first gas supply port disposed upstream of the reaction zone and from a second gas supply port disposed downstream of the reaction zone, and
   a gas exhaust unit configured to discharge gas in the chamber from a gas venting port disposed in the reaction zone or in close proximity thereto.

22. The apparatus according to claim 21, wherein the carbon source supply port and the base material introduction port are each disposed in an upstream region of the reaction zone or in proximity to the upstream side thereof, and
   the gas venting port is disposed in a downstream region of the reaction zone or in proximity to the downstream side thereof.

23. The apparatus according to claim 17, wherein the carbon source vapor supply device comprises:
   a storage tank that stores a liquid carbon source for forming the carbon source vapor, and
   a vaporization chamber configured to vaporize the liquid carbon source supplied from the storage tank.

24. The apparatus according to claim 17, wherein the ribs project from the at least one inner peripheral wall of the hollow body and have a first end spaced from a second end in the direction of the major axis.

* * * * *

UNITED STATES PATENT AND TRADEMARK OFFICE
CERTIFICATE OF CORRECTION

PATENT NO. : 8,709,539 B2 Page 1 of 1
APPLICATION NO. : 13/201747
DATED : April 29, 2014
INVENTOR(S) : Ando et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 140 days.

Signed and Sealed this
Twenty-ninth Day of September, 2015

Michelle K. Lee
*Director of the United States Patent and Trademark Office*